US010454262B2

(12) United States Patent
Niles et al.

(10) Patent No.: US 10,454,262 B2
(45) Date of Patent: Oct. 22, 2019

(54) ELECTRICAL POWER TRANSMISSION PROTECTORS WITH COMPONENT GRIPPERS, AND RELATED METHODS

(71) Applicant: Cantega Technologies Inc., Edmonton (CA)

(72) Inventors: Martin S. Niles, Stony Plain (CA); Edmond LeRouzic, Edmonton (CA); Keith I Yeats, Edmonton (CA)

(73) Assignee: Cantega Technologies Inc., Edmonton (CA)

( * ) Notice: Subject to any disclaimer, the term of this patent is extended or adjusted under 35 U.S.C. 154(b) by 0 days.

(21) Appl. No.: 15/967,252

(22) Filed: Apr. 30, 2018

(65) Prior Publication Data

US 2018/0316171 A1 Nov. 1, 2018

Related U.S. Application Data

(63) Continuation of application No. 14/331,153, filed on Jul. 14, 2014, now Pat. No. 9,960,586.

(60) Provisional application No. 61/845,777, filed on Jul. 12, 2013.

(51) Int. Cl.
| | | |
|---|---|---|
| *H02B 1/06* | (2006.01) | |
| *H02G 7/00* | (2006.01) | |
| *H01B 17/00* | (2006.01) | |
| *H02G 1/02* | (2006.01) | |

(52) U.S. Cl.
CPC ............... *H02G 7/00* (2013.01); *H01B 17/00* (2013.01); *H02G 1/02* (2013.01)

(58) Field of Classification Search
CPC . H02G 7/00; H02G 1/02; H01B 17/00; H01B 19/00; H01B 17/005; H01B 17/56; H01B 17/26; H01B 7/00; H01F 27/02; H05K 5/03; H01R 4/70

USPC ......... 174/152 G, 153 G, 135, 152 R, 138 R, 174/139, 138 F, 137 R, 5 R, 14 BH
See application file for complete search history.

(56) References Cited

U.S. PATENT DOCUMENTS

| | | | |
|---|---|---|---|
| 949,184 | A | 2/1910 | Kelman |
| 983,039 | A | 1/1911 | Field |
| 1,177,867 | A | 4/1916 | Johnson |

(Continued)

FOREIGN PATENT DOCUMENTS

| | | |
|---|---|---|
| DE | 3528771 A1 | 2/1987 |
| DE | 20112659 U1 | 10/2001 |

(Continued)

OTHER PUBLICATIONS

Howard Industries, Inc., "2163 Wildlife Protector," Laurel, MS, USA, © 2002, 2 pages.

(Continued)

*Primary Examiner* — Angel R Estrada
(74) *Attorney, Agent, or Firm* — Christensen O'Connor Johnson Kindness, PLLC; Ryan E. Dodge, Jr.

(57) ABSTRACT

A dielectric cover for protecting a component of an electrical power transmission system, the dielectric cover comprising: an enclosing part having enclosing portions that are configured for relative movement to each other to enclose the component; and a gripping part having gripping portions that are configured for relative movement to each other to grip the component, the movement of the gripping portions being independent of the relative movement of the enclosing part.

24 Claims, 31 Drawing Sheets

(56) References Cited

U.S. PATENT DOCUMENTS

| | | | |
|---|---|---|---|
| 1,766,636 A | 6/1930 | Holzel | |
| 2,263,319 A | 11/1941 | Treanor | |
| 2,834,829 A | 5/1958 | Broverman | |
| 2,840,631 A | 6/1958 | Marcroft | |
| 2,875,267 A | 2/1959 | Sutton, Jr. | |
| 2,989,789 A | 6/1961 | Cohn | |
| 3,019,287 A | 1/1962 | Newcomb, Jr. | |
| 3,042,736 A | 7/1962 | Salisbury | |
| 3,079,457 A | 2/1963 | Newcomb, Jr. | |
| 3,238,291 A | 3/1966 | Bosch et al. | |
| 3,270,120 A | 8/1966 | Van Name et al. | |
| 3,328,511 A * | 6/1967 | Cagle | H02G 7/00 |
| | | | 174/138 R |
| 3,484,541 A | 12/1969 | Campbell | |
| 3,510,568 A | 5/1970 | Cochran | |
| 3,639,678 A | 2/1972 | Muschong | |
| 3,639,681 A | 2/1972 | Ettlinger | |
| 3,766,310 A | 10/1973 | Paschen | |
| 3,835,238 A | 9/1974 | West | |
| 4,234,753 A | 11/1980 | Clutter | |
| 4,280,013 A | 7/1981 | Clutter | |
| 4,845,307 A | 7/1989 | Cumming et al. | |
| 4,985,599 A | 1/1991 | Eggleston | |
| 5,069,310 A | 12/1991 | Williams et al. | |
| 5,153,383 A | 10/1992 | Whited et al. | |
| 5,293,721 A | 3/1994 | Richard et al. | |
| D357,458 S | 4/1995 | Tisbo | |
| 5,873,324 A | 2/1999 | Kaddas et al. | |
| 6,005,196 A | 12/1999 | Spillyards | |
| 6,098,348 A | 8/2000 | Weaver | |
| D435,055 S | 12/2000 | Puigcerver et al. | |
| 6,195,861 B1 | 3/2001 | Frye et al. | |
| 6,255,597 B1 * | 7/2001 | Bowling | H01B 17/00 |
| | | | 174/138 F |
| 6,291,774 B1 | 9/2001 | Williams | |
| 6,303,870 B1 | 10/2001 | Nazaryan et al. | |
| 6,486,785 B1 | 11/2002 | Hoth | |
| 6,583,708 B1 | 6/2003 | Smith et al. | |
| 6,730,852 B1 * | 5/2004 | Puigcerver | H01B 17/58 |
| | | | 174/138 F |
| 6,770,809 B1 | 8/2004 | De France | |
| 6,812,400 B1 | 11/2004 | Lynch | |
| 6,864,427 B2 | 3/2005 | Radelet et al. | |
| 6,995,313 B1 * | 2/2006 | Barnett | H01B 17/00 |
| | | | 174/138 F |
| 7,075,015 B1 | 7/2006 | Rauckman | |
| 7,128,601 B2 | 10/2006 | Suemitsu et al. | |
| 7,154,034 B2 | 12/2006 | Lynch | |
| 7,154,036 B2 | 12/2006 | Lynch | |
| 7,196,265 B2 | 3/2007 | Spencer | |
| 7,201,600 B2 | 4/2007 | Sokol et al. | |
| 7,276,665 B1 | 10/2007 | Rauckman | |
| 7,297,869 B2 | 11/2007 | Hiller et al. | |
| 7,301,096 B2 | 11/2007 | Strong et al. | |
| 7,309,837 B1 | 12/2007 | Rauckman | |
| D580,878 S | 11/2008 | Milner | |
| D595,804 S | 7/2009 | Tollefson et al. | |
| 7,622,668 B1 | 11/2009 | Tollefson et al. | |
| 7,679,000 B2 * | 3/2010 | Rauckman | H01B 17/00 |
| | | | 174/135 |
| 7,772,499 B2 | 8/2010 | Rauckman | |
| 7,834,269 B2 | 11/2010 | Niles | |
| 7,839,256 B2 | 11/2010 | Bradford et al. | |
| 7,884,285 B2 | 2/2011 | Spencer | |
| 8,067,691 B2 | 11/2011 | Puigcerver et al. | |
| 8,115,102 B2 | 2/2012 | Frye | |
| 8,426,729 B2 | 4/2013 | Hiller et al. | |
| 8,633,391 B2 | 1/2014 | Strong et al. | |
| 8,723,056 B2 | 5/2014 | Kaddas et al. | |
| 8,772,633 B2 | 7/2014 | Behnken | |
| 8,859,905 B2 | 10/2014 | Frye | |
| 8,859,906 B2 | 10/2014 | Hiller et al. | |
| 8,901,428 B2 | 12/2014 | Miller et al. | |
| 8,907,222 B2 | 12/2014 | Stransky et al. | |
| 8,957,314 B2 | 2/2015 | Niles et al. | |
| 9,362,733 B2 | 6/2016 | Lynch | |
| 9,413,153 B2 | 8/2016 | Spencer et al. | |
| 9,472,325 B2 | 10/2016 | Lynch | |
| 9,499,972 B2 | 11/2016 | Kaddas et al. | |
| 9,646,743 B2 * | 5/2017 | Spencer | H01F 27/02 |
| 9,702,485 B2 | 6/2017 | Hiller et al. | |
| 9,741,476 B2 * | 8/2017 | Hiller | H01B 17/00 |
| 9,787,071 B1 | 10/2017 | Rauckman et al. | |
| 9,953,795 B2 | 4/2018 | Kester et al. | |
| 2003/0010528 A1 | 1/2003 | Niles | |
| 2005/0210769 A1 | 9/2005 | Harvey | |

FOREIGN PATENT DOCUMENTS

| | | |
|---|---|---|
| DE | 20314164 U1 | 12/2003 |
| EP | 1052657 A2 | 11/2000 |
| FR | 2167275 | 8/1973 |
| JP | 080007711 | 1/1996 |
| JP | 2012-185906 A | 9/2012 |
| KR | 100944270 | 2/2010 |
| NL | 2007369 | 3/2013 |
| WO | 2001063625 A2 | 8/2001 |
| WO | 2004064216 A2 | 7/2004 |
| WO | 2006081114 A1 | 8/2006 |
| WO | 2011094870 A1 | 8/2011 |

OTHER PUBLICATIONS

Hubbell Power Systems, "Cutout Covers 25kV Phase-to-Phase," available as early as Feb. 23, 2011, retrieved from <https://web.archive.org/web/20150317193939/http://westernsafety.com/hubbellpowersystems/hubbellpowerpg12.html>, 16 pages.
Midsun Group, "E/Cutout Cover," <http://www.midsungroupcom/E/Products/cutoutcovers.html> [retrieved Feb. 5, 2013], 2 pages.
Rauckman Utility Products, "RUP Outage Protection: Minimize Animal-Related Outages! Cutout Covers," available as early as Jun. 10, 2014, retrieved from <https://web.archive.org/web/20130820202814/http://www.rauckmanutility.com/homecutoutcover.htm>, © 2003-2013, 2 pages.
Alright Gear, "Covered High Voltage Fuse," <http://www.hellogear.com/product.detail_312803_th_2994461> [retrieved Jul. 11, 2014], © 2001-2014, 3 pages.
Tyco Electronics, "Substation Asset Protection for Wildlife: BCIC-5D-6," <http://energy.tycoelectronics.com> [retrieved May 20, 2008], © 2007, 1 page.
Tyco Electronics, "Substation Asset Protection for Wildlife: BCIC-8D/18," <http://energy.tycoelectronics.com> [retrieved May 20, 2008], © 2007, 2 pages.
Tyco Electronics, "Substation Asset Protection for Wildlife: BCIC-10D/18," <http://energy.tycoelectronics.com> [retrieved May 20, 2008], © 2007, 1 page.
Tyco Electronics, "Substation Asset Protection for Wildlife: BCIC-4411," <http://energy.tycoelectronics.com> [retrieved May 20, 2008], © 2007, 1 page.
Tyco Electronics, "Substation Asset Protection for Wildlife: BCAC-8D/14," <http://energy.tycoelectronics.com> [retrieved May 20, 2008], © 2007, 1 page.
Salisbury, "Outage Protection," Skokie, IL, USA, 2007, 32 pages.
Salisbury by Honeywell, "2012 Utility Products," Bolingbrook, IL, USA, © 2011, 51 pages.
Salisbury by Honeywell, "Substation Cover-up—Switch Jaw Guard and Barrier," <http://www.salisburybyhoneywell.com/en-US/Pages/Category.aspx?cate> [retrieved Feb. 14, 2013], 1 page.
Salisbury, "Outage Protection," Skokie, IL, USA, © 2006, 18 pages.
ABB Inc., "Single-Phase Overhead Distribution Switches: Types DCD, RBD, SID, LSID, and ITD," Product Bulletin, North Pinetops, NC, USA, © 2010, 12 pages.
Midsun Group, "E/Products: Insulating Products," <http://midsungroup.com/new_page.htm> [retrieved May 14, 2008], 2 pages.
Salisbury by Honeywell, "Greenjacket," Product Specifications, Bolingbrook, IL, USA, © 2011, 2 pages.

(56) References Cited

OTHER PUBLICATIONS

Central Moloney, Inc. "Wildlife Guards," Apr. 7, 2013, retrieved from <https://web.archive.org/web/20160912082313/http://centralmoloneyinc.com/components/wildlife_guards/default.aspx>, © 2008, 2 pages.
Salisbury by Honeywell, "Greenjacket: Site Protection Plan," Rev. 1.0, Jul. 21, 2011, Bolingbrook, IL, USA, 4 pages.
Salisbury, "Outage Protection," believed to be available 2012, <https://www.salisburybyhoneywell.com/en/utility/~/media/ePresence/Extranet/Salisbury/PDFs/Utility/outage_protection.pdf>, 8 pages.
Tyco Electronics Corporation, "Bus Insulation and Wildlife Protection Products: BCAC," Jul. 13, 2004, 1 page.
Preformed Line Products, "Section 19—Distribution (Overhead): Wildlife Protection," Jun. 5, 2013, 8 pages.
Central Moloney, Inc., "Customer Data Sheet: Handwheel Type Wildlife Guards," Aug. 21, 2008, Pine Bluff, AK, USA, 1 page.

\* cited by examiner

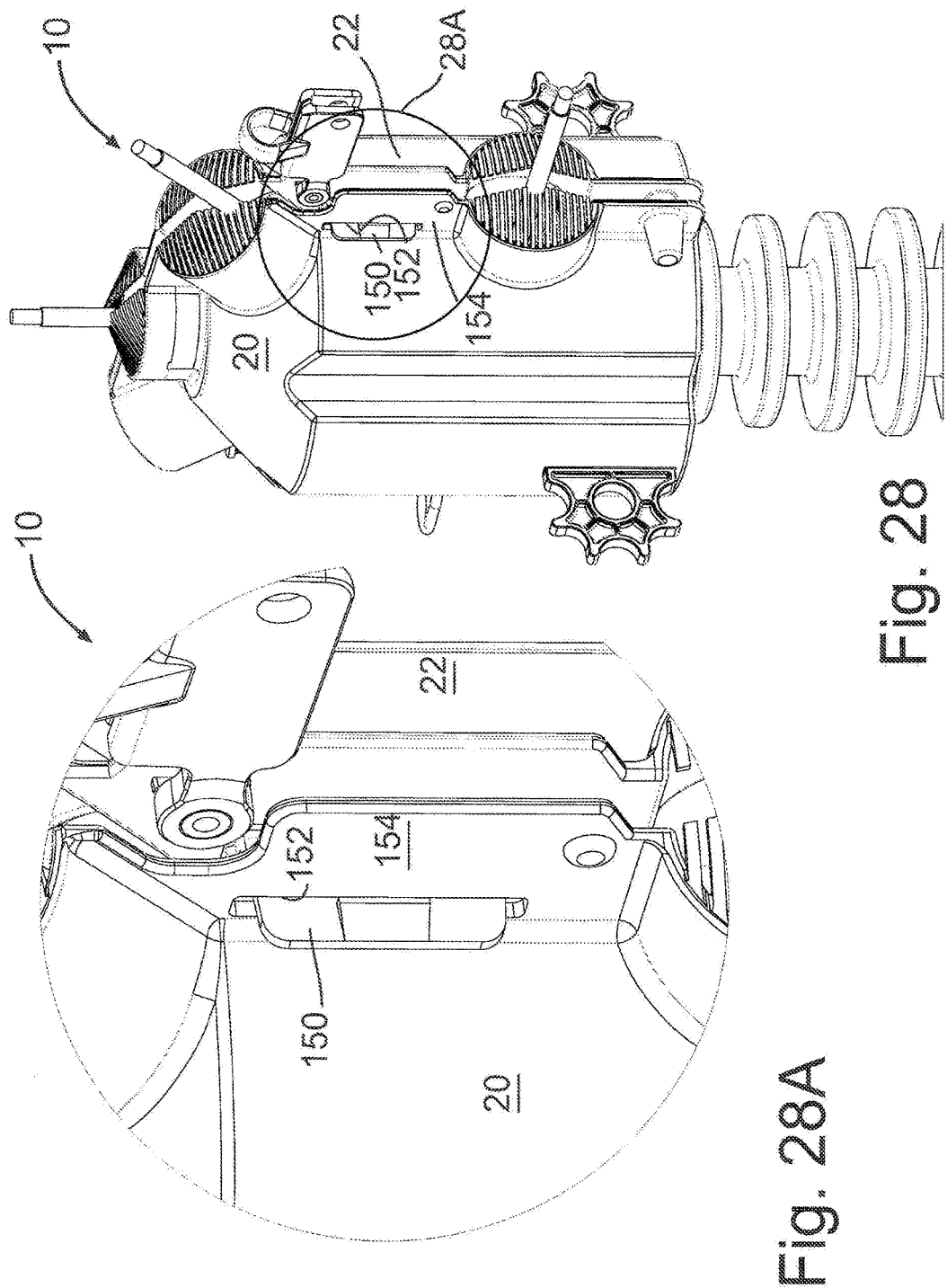

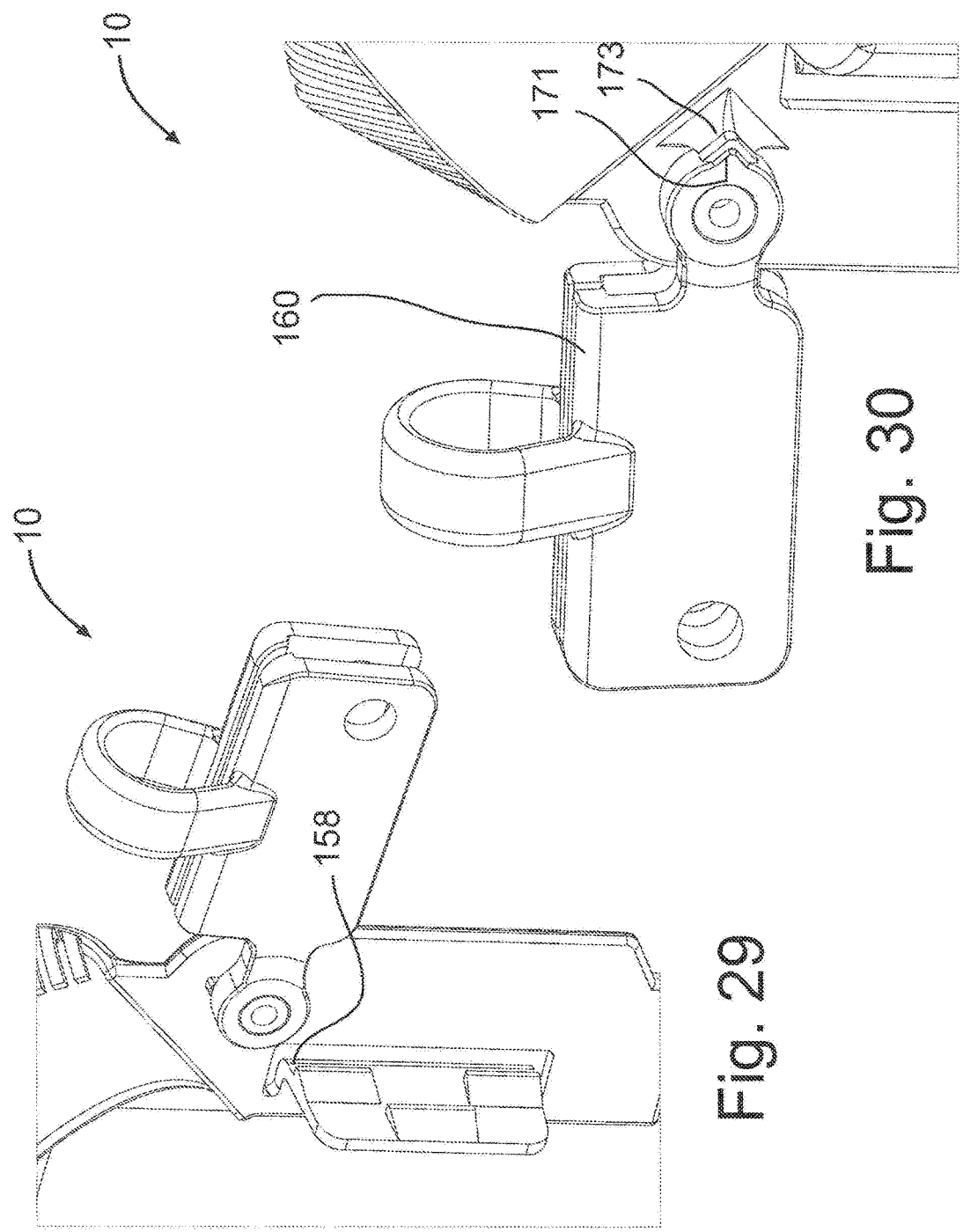

ELECTRICAL POWER TRANSMISSION PROTECTORS WITH COMPONENT GRIPPERS, AND RELATED METHODS

BACKGROUND

The apparatus and method disclosed here relate to the field of electrical power transmission and distribution. There exists a variety of covers used to insulate components of electrical power systems from short circuits caused by contact with animals and birds. Hinged two-piece covers and one-piece snap on covers are examples. These covers may be installed remotely by one or more users. Cutout covers, bushing covers, and lightning arrestor covers are some examples.

The inventor's own prior patent documents disclose dielectric covers for protecting components of electrical power transmission systems, see United States patent publication no. 20080123254 and PCT publication no. WO2011094870, as well as methods of making such protectors. Other protectors are available. In general, these protectors are hinged devices or similar configurations.

SUMMARY

A dielectric cover for protecting a component of an electrical power transmission system, the dielectric cover comprising: an enclosing part having enclosing portions that are configured for relative movement to each other to enclose the component; and a gripping part having gripping portions that are configured for relative movement to each other to grip the component, the movement of the gripping portions being independent of the relative movement of the enclosing part.

A method is also disclosed for protecting a component of an electrical power transmission system, the method comprising: securing a gripping part of a dielectric cover to the component, the gripping part connected to an enclosing part having enclosing portions; and after securing the gripping part, moving the enclosing portions relative one another to close the enclosing portions over the component.

A dielectric cover is also disclosed for protecting a component of an electrical power transmission system, the dielectric cover comprising: opposed portions that are movable in relation to each other from an open position to a closed position and define a component enclosing space at least when in the closed position; a component gripper on a first portion of the opposed portions, the component gripper being configured to grip the component independently of a second portion of the opposed portions; and a lock for securing the opposed portions together in the closed position.

A method is disclosed for protecting a component of an electrical power transmission system, the method comprising: securing a first portion of the opposed portions of a dielectric cover to the component, the opposed portions being movable in relation to each other from an open position to a closed position; after securing the first portion, moving a second portion of the opposed portions relative to the first portion to close the opposed portions over the component; and locking the opposed portions together in the closed position.

An apparatus is disclosed for protecting a component of an electrical power transmission system, the apparatus comprising: a dielectric cover having opposed portions that define, at least when in a closed position, a component enclosing space between a hinge and outer cooperating flanges of the opposed portions, the outer cooperating flanges having apertures aligned when in the closed position; and a threaded bolt positioned between one or both of the respective apertures of the opposed portions for securing and moving the opposed portions into the closed position.

In various embodiments, there may be included any one or more of the following features: Each enclosing portion of the enclosing portions has a respective hot stick connector. The enclosing portions form a clamshell cover. The gripping part comprises one or more spring latches for gripping at least part of the component between the one or more spring latches. The gripping part comprises a pair of spring latches opposed to one another. Each of the one or more spring latches is terraced to provide plural latch stops for fitting components of different dimensions. Each of the one or more spring latches has a latch release handle. The gripping part is C-shaped. The dielectric cover is shaped to fit a fuse cutout component. The gripping part is C-shaped to fit over, and around side edges of, an upper contact plate of the fuse cutout component. The gripping part has a flange guard for covering the upper contact plate. The gripper is shaped to fit an insulator bushing. The gripping part further comprises a split ring spring latch at a base of the dielectric cover. The split ring spring latch is collectively formed at least in part by a plurality of tines. The lock is a fastener positioned between apertures aligned in outer cooperating flanges of the enclosing portions when in a locked and closed position. The fastener comprises a threaded bolt. The dielectric cover has an opened and uninstalled position where the threaded bolt is inserted through a respective aperture in the second portion of the enclosing portions. The threaded bolt has an eyelet for a hot stick. The threaded bolt has one or more lateral handles. The method is done remotely using a hot stick. The method is carried out by a user located outside a safe Limit of Approach. The threaded bolt has an eyelet for a hot stick, and one or more lateral handles about the eyelet. The gripping part comprises a gripper insert removeably mounted in use to a gripper receiver on one of the enclosing portions. Each enclosing portion comprises a gripper receiver for independently receiving the gripper insert. a lock for securing the enclosing portions together in a closed position. The enclosing portions are connected via a hinge. A pull wire is passed through apertures aligned in cooperating flanges of the enclosing portions when in the closed position, at least one end of the pull wire having a flange stop and at least the other end having a hot stick connector. The lock comprises a swing arm with a slot shaped to receive cooperating flanges of the opposed portions when in a locked and closed position, the swing arm having a pivot axis that passes through an interface plane defined by the cooperating flanges. Locking the opposed portions together in the closed position.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 22-33 are a sequence of perspective views illustrating a method of installing the bushing cover of FIG. 11 with a hot stick. FIGS. 22-23 illustrate the hot stick positioning the open bushing cover onto the top flight of a bushing. FIGS. 24-26 illustrate the closing of the cover using a pull wire in the hinge flanges of the cover. FIG. 27 illustrates the cover before being completely closed. FIGS. 28, 28A, and 29-33 illustrate the operation of the latch mechanism for locking the bushing cover. FIG. 28A is a close up taken along the 28A circle from FIG. 28.

DETAILED DESCRIPTION

Figure 1:
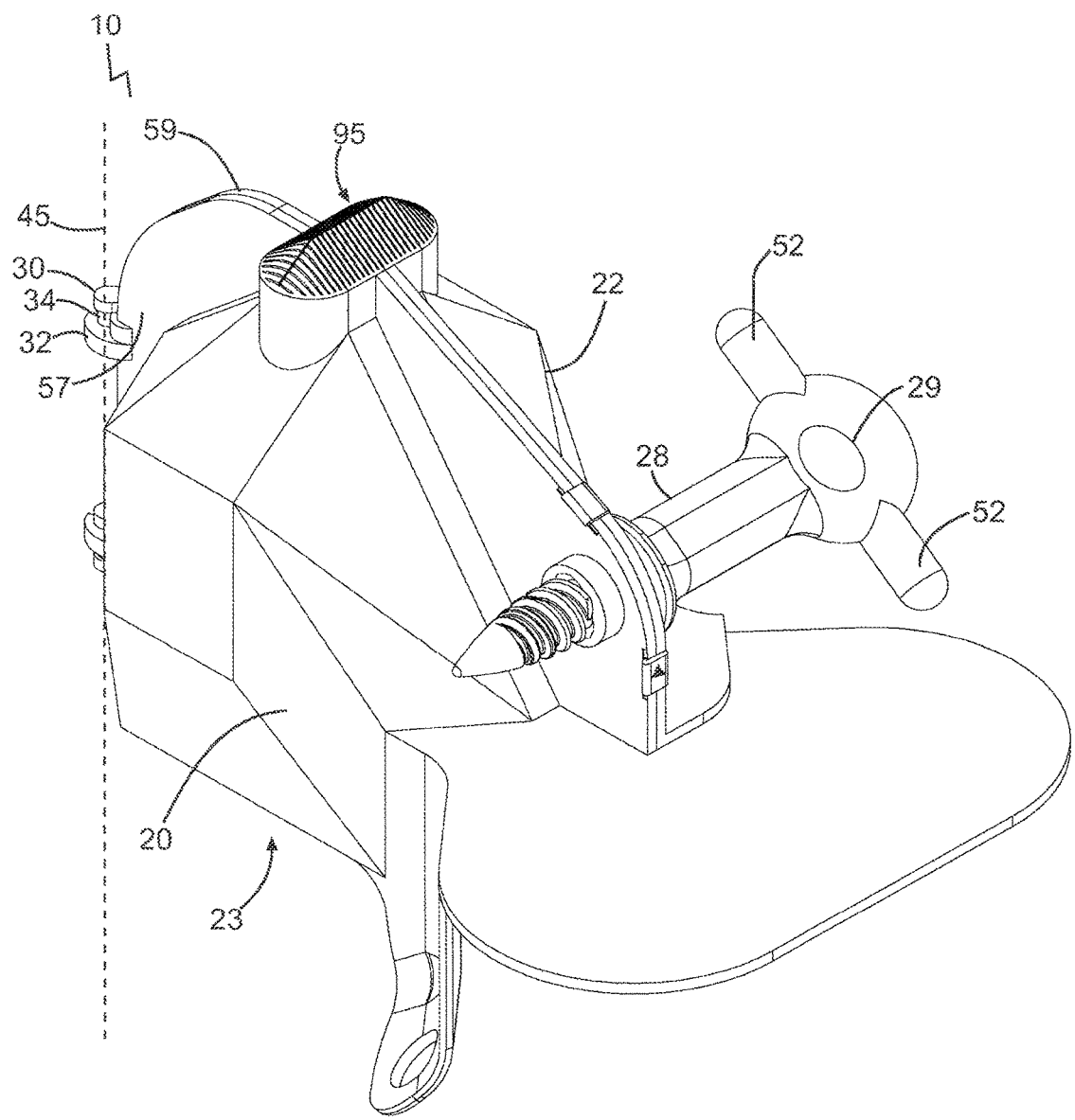
FIG. 1 is a perspective view of a cutout cover.

Immaterial modifications may be made to the embodiments described here without departing from what is covered by the claims.

Long-distance electricity transmission is typically carried with high voltage conductors. Transmission at higher voltages reduces resistance power loss, therefore line voltage for long distance lines is stepped up after generation by passing it through transformer stations prior to feeding the power to long-distance transmission lines. Transmission lines traverse large regions and require numerous support towers. The conductors in high tension powerlines are typically uninsulated because of the cost and additional weight of insulated versus uninsulated conductors. Because clearances between adjacent energized elements, and energized and grounded elements, are generally large in transmission systems, these systems generally are not at risk for animal-caused faults or outages.

Substations transform power from transmission voltages to distribution voltages, typically ranging from 2400 volts to 37,500 volts. Distribution voltages allow for reduced system clearances. These reduced clearances between phase to ground and phase to phase, increase system susceptibility to bird or animal caused outages. Electric poles, towers, and other electrical equipment including substations may provide attractive roosts for birds, particularly in treeless regions. If the wings of a bird simultaneously contact a conductor and another object such as an adjacent conductor, support tower or tree, the resulting electrical short-circuit can kill the bird and also damage the power system. The electrical short circuit can further cause electrical system damage resulting in power outages.

Further, the nesting of birds in open cavities in electrical systems increases the risk that predators will be attracted to the nests and cause a power fault or outage. Predators include mammals such as raccoons and cats, birds such as magpies, and snakes. Predators can also cause electrical short-circuits that can cause electrical faults or outages, damage power systems, and kill the predator. Faults caused by birds and other animals often trigger sensitive relay protection schemes, resulting in substation lockouts, interrupting service to thousands or possibly tens of thousands of customers and at the same time damaging expensive substation equipment.

Thus, some electrical power systems are being insulated from short circuits caused by contact by birds and other animals. The variety and number of proposed solutions for repelling birds and other animals from electrocution risks highlights the persistence and magnitude of the problems created by such undesirable intrusion. Many different types of scarecrows and other moving devices have been developed to repel birds. In addition to moving devices, various physical structures often involving spikes or other physical barriers, have been developed to discourage birds from roosting on structures. Other bird repelling concepts use electricity or magnetic fields to discourage bird intrusion. Equipment shield and cage devices have been specifically designed to block birds and other animals from accessing and short-circuiting electrical leads, such as described in U.S. Pat. Nos. 5,153,383 and 5,485,307.

Generally, the process of retrofitting electrical equipment with dielectric protective covers may be costly and may require powering down the system. Power down interruptions for the purpose of installing protective covers can keep a system down for a half a day or longer time periods, at great cost. Some systems are operated under the direction of a regulatory and scheduling authority that controls the system's downtime scheduling. In locations with minimal spare power transmission capacity, it can be a challenge for a system to get the downtime needed to install protective covers. Because electrical systems are usually scheduled for maintenance downtime on a fairly short notice (typically a week for non-emergency situations), and because scheduled downtime may be cancelled by the Regulatory Authority on an extremely short notice, there is no guarantee that a component protector will be installed during a system's available downtime period. As a result, a system can experience significant delays in protecting their equipment. Thus, in some cases it may not be feasible to de-energize electrical equipment in order to install covers and as a result covers may need to be installed remotely on energized equipment.

In addition, remote installation may also be required on energized or non-energized equipment, including equipment that is difficult to access directly.

Figure 2:
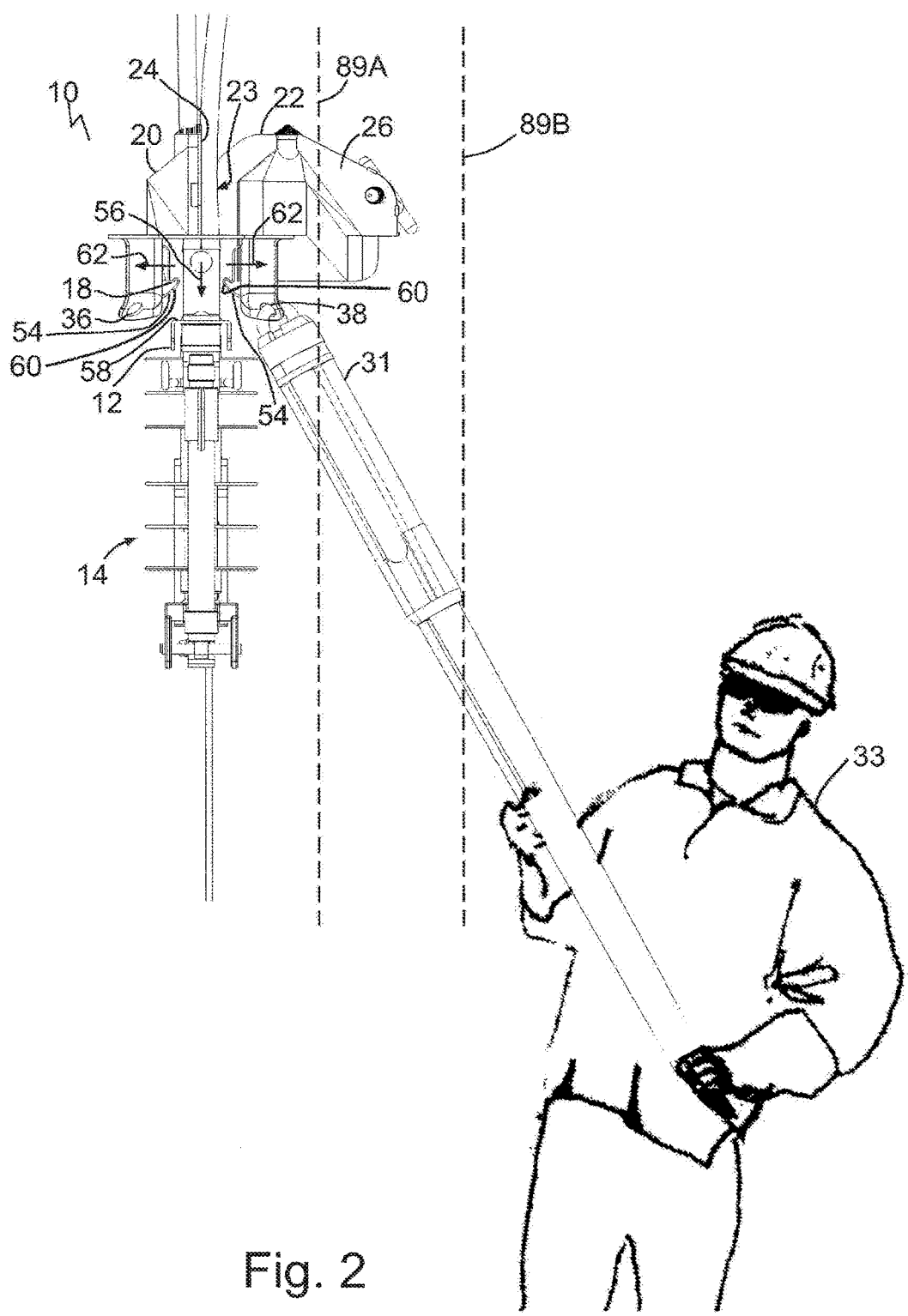
FIG. 2 is a side elevation view of the cover of FIG. 1 being remotely positioned over a cutout switch using a hot stick.
Figure 3:
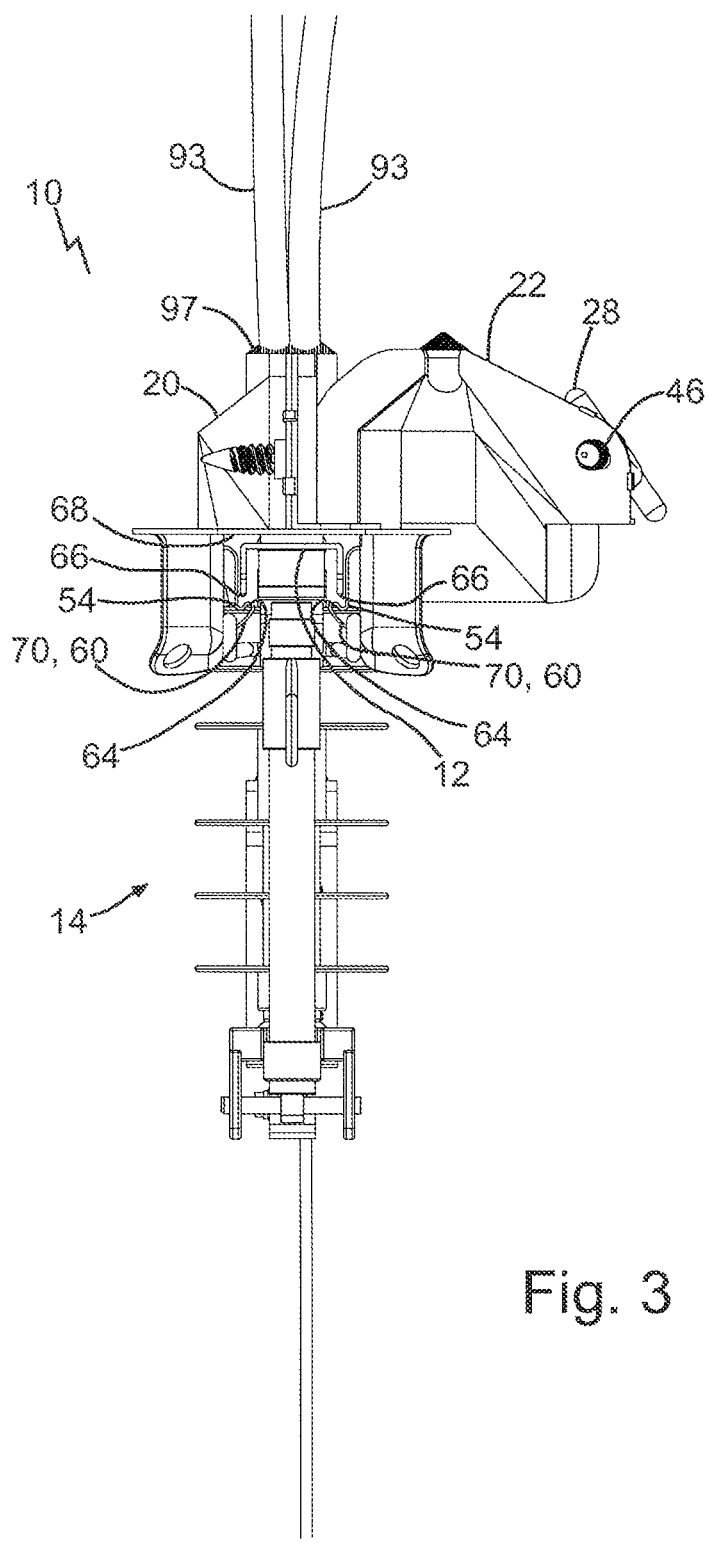
FIG. 3 is a side elevation view of the cover of FIG. 1 with the gripping portion secured to the cutout switch before the enclosing portions of the cover are secured together.
Figure 4:
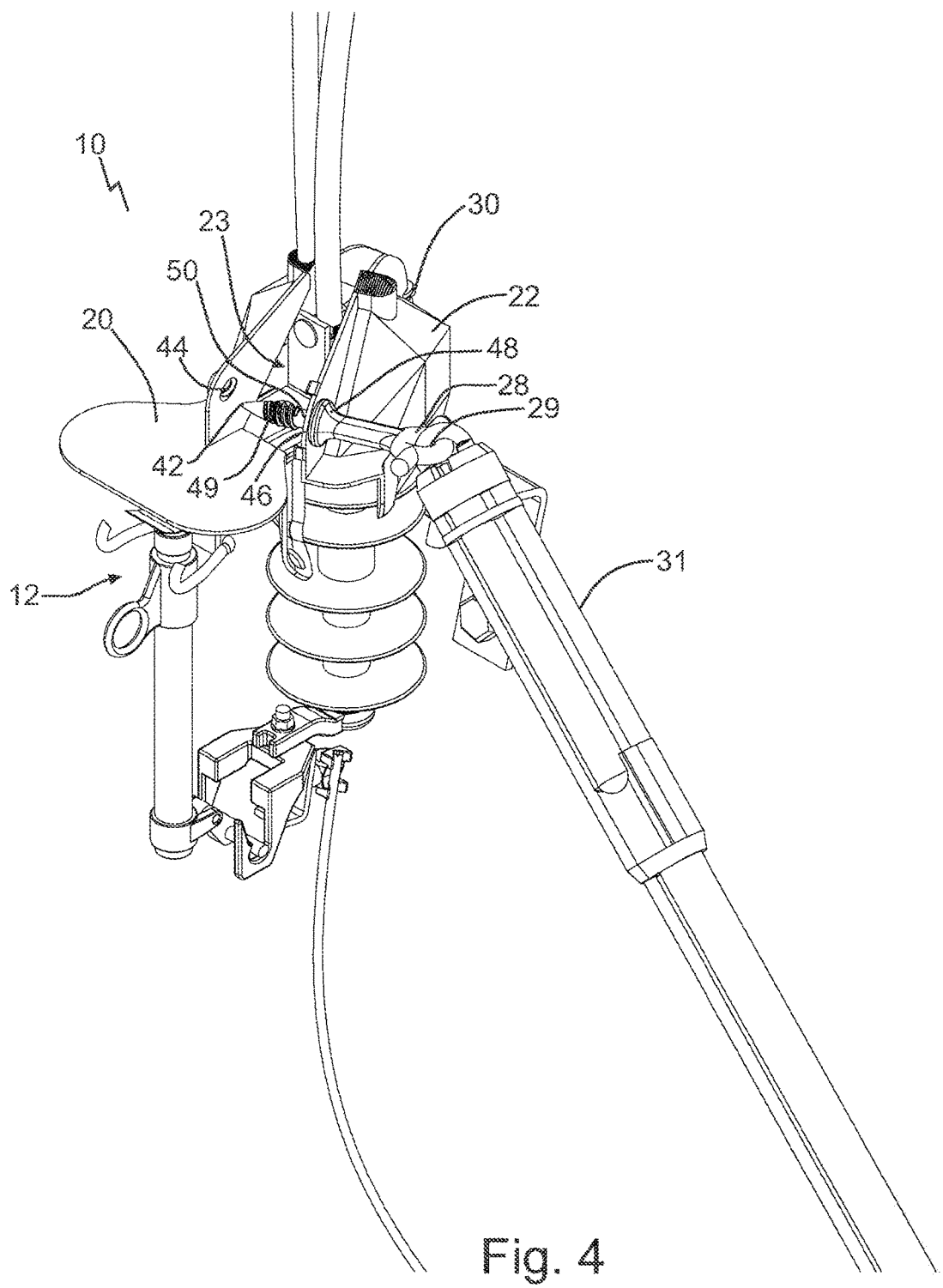
FIG. 4 is a perspective view of the cover of FIG. 1 with the free portion of the enclosing portions of the cover being moved to close the cover with a hot stick.
Figure 5:
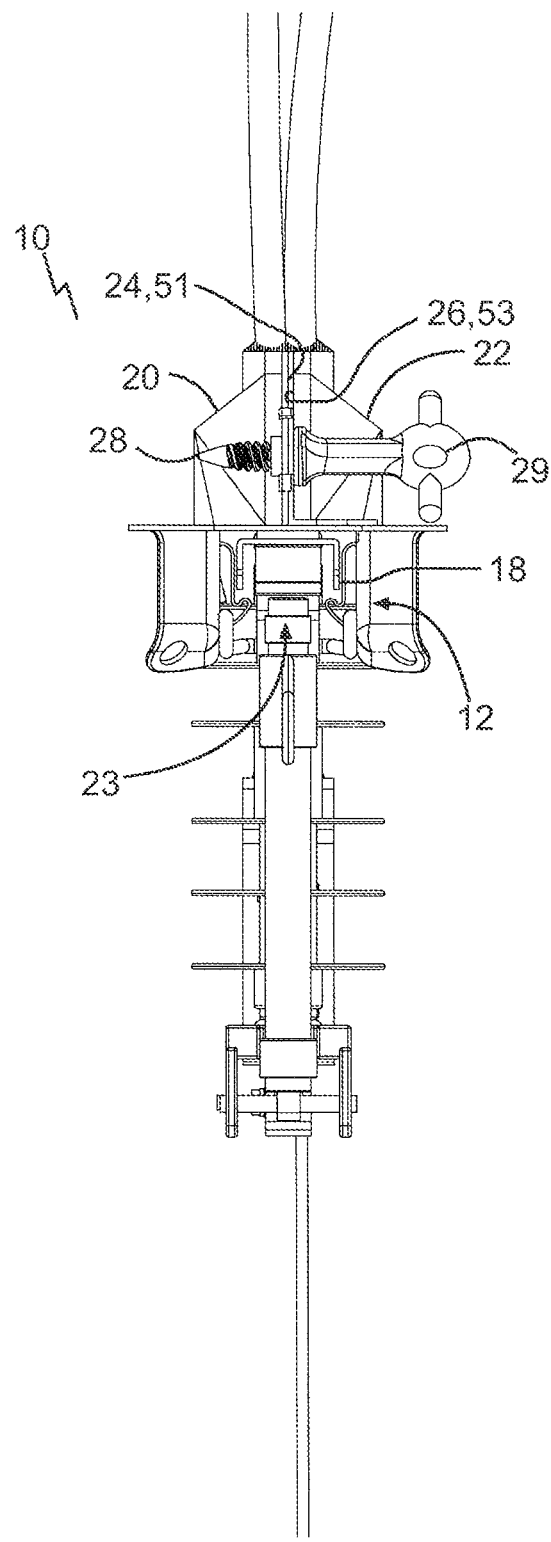
FIG. 5 is a side elevation view of the cover of FIG. 1 after securing the enclosing portions of the cover together.

Referring to FIGS. 1-5, a dielectric cover 10 for protecting a component 12 of an electrical power transmission system 14 is illustrated. Cover 10 comprises a gripping part 18 and an enclosing part. The enclosing part has enclosing portions 20, 22, which are movable in relation to each other from an open position (FIG. 2) to a closed position (FIG. 5) to enclose the component. Enclosing portions 20, 22 may be opposed relative to one another as shown. Portions 20, 22 thus define a component enclosing space 23 at least when in a closed position (FIG. 5). Referring to FIG. 2, portions 20, 22 are illustrated as opened. Enclosing portions 20 and 22 may be configured to meet or contact one another in the closed positions along respective enclosing edges or flanges 24, 26 (FIG. 5). Dielectric cover 10 may have an open position in which enclosing edges 24, 26, of the enclosing portions are like opened jaws and are spaced to allow entry of the component 12 between the enclosing edges 24, 26 into the dielectric cover 16 (FIG. 2). Such a cover 10 may be referred to as a clamshell cover.

Gripping part 18 may be positioned on a first portion 20 of the enclosing portions (FIG. 3). The gripping part or component gripper 18 has gripping portions, such as spring latches 54, which are configured for relative movement to each other to grip the component 12. The movement of the gripping portions is independent of the relative movement of the enclosing portions. Thus, gripping portion 18 may be configured to grip the component 12 independently of a second portion 22 of the enclosing portions. To install cover 10 the first portion 20 is secured to the component 12 (sequence shown in FIGS. 2-3). In the example shown the second portion 22 is free to move, for example about a hinge 30, relative to first portion 20 once the gripping part 18 has secured first portion 20 to the component 12 (FIGS. 3 and 4).

The gripping part 18 may further comprise one or more spring latches 54, for example a pair of latches opposed to one another, for gripping at least part of the component 12 between the one or more spring latches 54 and the one of the enclosing portions 20, 22 (FIG. 2). Latches 54 may collectively function as a clip that slides on and locks to the component. As the first portion 20 is lowered into place along direction 56, component 12, for example an upper contact plate 58, contacts respective sloped guide portions 60 of latches 54 and biases latches 54 outward along directions 62. When respective shoulders 64 of latches 54 clear side edges 66 of upper contact plate 58, the latches 54 close towards one another, enclosing the upper contact plate 58 between shoulders 64 and a base-facing flange 68 of cover 10 (FIG. 3). In the example shown, gripper 18 is C-shaped to fit over and around, for example clip to, edges 66 of the fuse cutout component 12. Flange 68 may cover the upper contact plate 58 and extend like a table over and beyond plate 58 to reduce or prevent contact between plate 58 and wildlife. Each latch 54 may have a latch release handle 70, for example extended from shoulders 64, to permit manual release of latches 54 in the event that a user desires to remove cover 10 from component 12. In the example shown the handles 70 also define the sloped guide portions 60 that open the latches 54 when the part of the component 12 is inserted into the gripping part 18.

To permit remote securing of gripper 18 to component 12, cover 10 may have one or more hot stick connectors 36 and 38, for example shown as apertures in first portion 20 (FIG. 2). In the sequence of FIGS. 2-3, connector 38 is engaged and remotely positioned with a hot stick 31 to secure gripper 18 to component 12. A conventional universal grip-all ("shotgun") dielectric hot stick 31 may be used for remote operations as shown, although other types of hot sticks may be used.

After securing the first portion 20, the second portion 22 of the enclosing portions is moved, for example swung, relative to the first portion 20 to close the enclosing portions over the component 12 (sequence from FIGS. 4-5). Swinging may also be done with a hot stick 31. For example, hot stick 31 may connect to a tool or hot stick connector on the portion 22 such as an eyelet 29 in a threaded bolt fastener 28. Because first portion 20 is secured to component 12 by gripper 18, a lateral force from hot stick 31 through fastener 28 will rotate portion 20 into the closed position as shown.

The enclosing portions 20, 22 may then be locked together in the closed position, for example using a fastener like a threaded bolt 28 (FIG. 5). In the example shown, locking and moving the second portion 22 may occur simultaneously, as a pointed end 42 of bolt 28 engages aperture 44 in first portion 20 followed by rotation of bolt 28 with hot stick 31 to screw bolt 28 securely into aperture 44 (FIGS. 4 and 5). Bolt 28 may be mounted for rotation within an aperture 46 of second portion 22 to ensure that rotation of bolt 28 draws corresponding flanges or edges 24 and 26 together on rotation once bolt 28 is threadably engaged within aperture 44. A radial flange 48 on bolt 28 and an unthreaded intermediate portion 50 between a threaded portion 49 and radial flange 48 permit rotation of bolt 28 within aperture 46 without relative axial movement between bolt 28 and second portion 22 (FIG. 4).

Bolt 28 may be installed through aperture 46 by threading bolt 28 through aperture 46 until intermediate portion 50 bears within aperture 46. Threaded bolt 28 may have one or more lateral handles 52 for example about the eyelet 29 to permit direct rotation by a user wearing thick dielectric gloves (FIG. 1). The combination of eyelet 29 and handles 52 permits manual installation or remote installation via a hot stick 31, respectively.

Apertures 44 and 46 may align when in the closed position (FIG. 5). In some cases bolt 28 may be positioned on outer cooperating flanges 51 and 53 of the enclosing portions 20, 22, respectively, such that component enclosing space 23 is between hinge 30 and flanges 51 and 53 when in the closed position (FIG. 5). Bolt 28 or another type of spreader may be used to give positive control over at least a portion of the range of swinging motion required to close the cover 10. Positive control includes the ability to precisely control the movement and position of portions of the cover relative to one another and to the surrounding space throughout a range of movements from open to closed. Such control may be advantageous particularly at the end of a swinging sequence when portions 20, 22 are almost closed and portions 20 and 22 begin to fit together. At such a stage bolt 28 acts to pull the portions 20 and 22 together, overcoming friction cause by imperfect construction or alignment between edges 24 and 26 about the perimeter of cover 10.

Other lock systems than as shown may be used. For example, the lock may comprise a pin and slot, cam lock, eyelet and lock, latching mechanism, Velcro™ strips or other suitable mechanisms. A lock in a simple form may be a mechanism that restricts the opening of portions 20 and 22 when closed. The lock may be remotely actuated for example as shown using hot stick 31.

The cover 10 is configured to permit relative movement between enclosing portions 20 and 22. Thus, cover 10 may further comprise a hinge 30 between the enclosing portions 20, 22 (FIGS. 1 and 4). The hinge 30 may define a pivot axis 45 that is spaced outwardly, for example using flanges 57 and 59, from the component enclosure 23. Spacing the hinge 30 outward increases the radius of curvature at the outer most edges 24 and 26, thus reducing the angle of attack when swinging the portions 20, 22 into the closed position. In other cases portions 20 and 22 may be connected by one or more intermediate portions (not shown). Hinge 30 may be comprised of one or more hooks 32 and rods 34 (FIG. 1), a snap hinge (FIG. 9), a piano hinge, a living hinge, or other suitable hinge structures.

Figure 6:
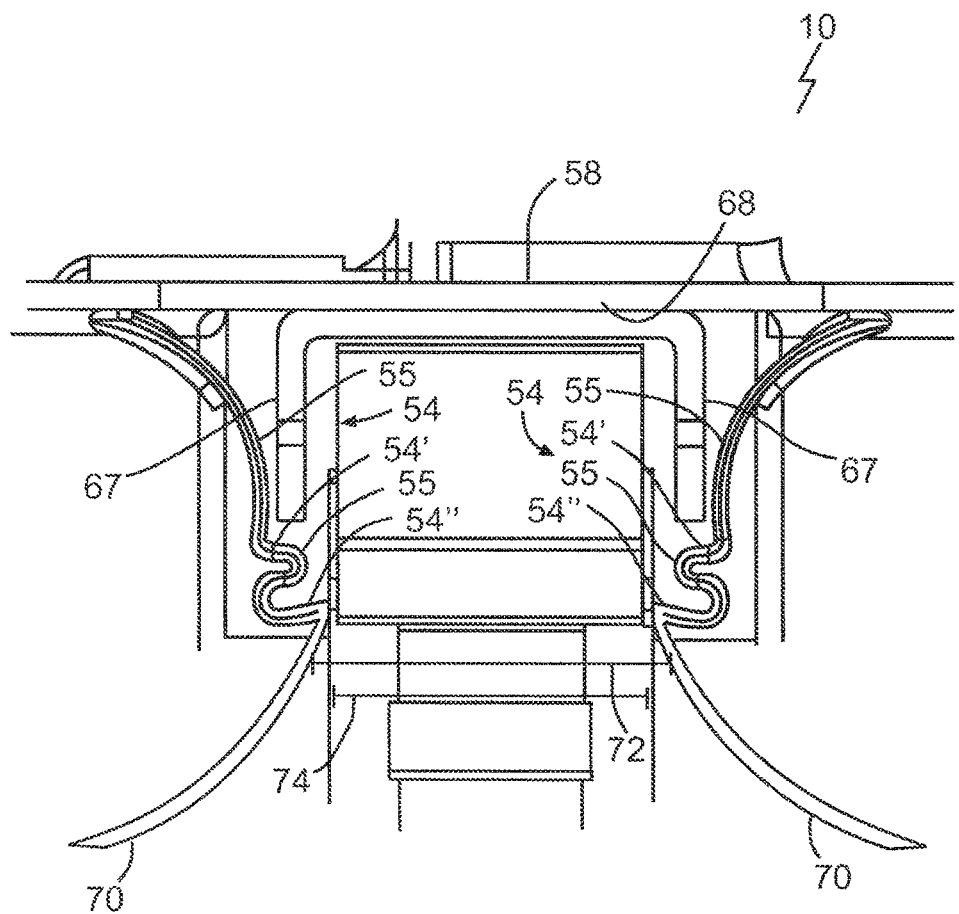
FIG. 6 is a side elevation view of a cutout cover embodiment with terraced latches for plural cutout switch sizes.

Referring to FIG. 6, a variant of the gripping part 18 from the cutout cover 10 of FIG. 3 is illustrated. Each of the one or more spring latches 54 is terraced to provide plural latch stops 54' and 54" for fitting components 12, in this case upper contact plates 58, of different dimensions. Terracing in the example shown, which includes a pair of opposed latches 54, may include progressively smaller separation distances 72 and 74 with distance from flange guard 68. Thus, a relatively narrower upper contact plate 58 than the one illustrated may only need to be positioned past stops or latches 54". Lateral shoulders 55 may grip sides 67 of upper contact plate 58 in order to secure cover 10 in place on component 12. Latch release handles 70 may be accentuated to facilitate remote unlatching, and may include one or more hot stick connectors (not shown).

Figure 7:
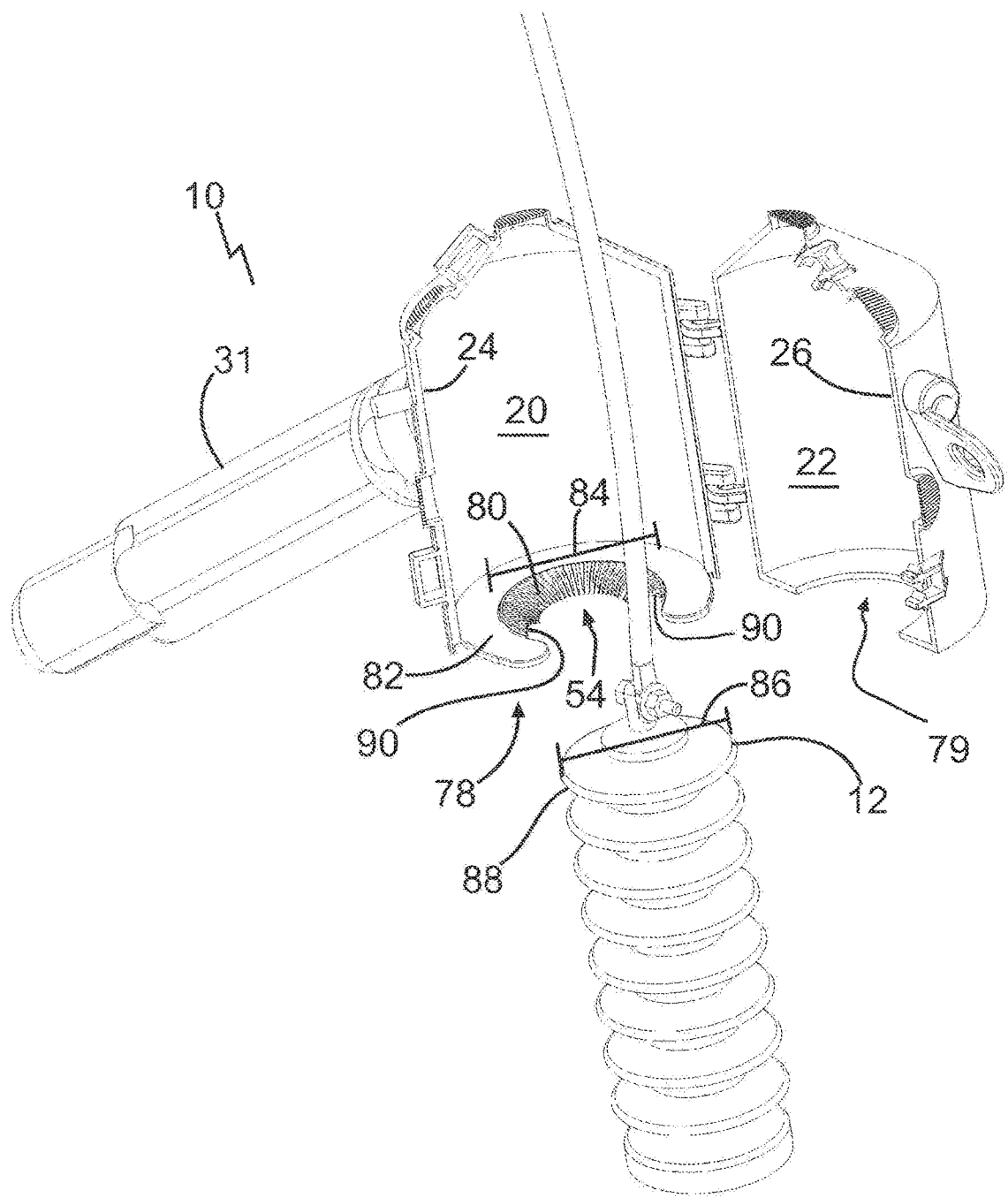
FIG. 7 is a perspective view of a bushing cover with a gripping portion, being remotely positioned over a bushing.
Figure 8:
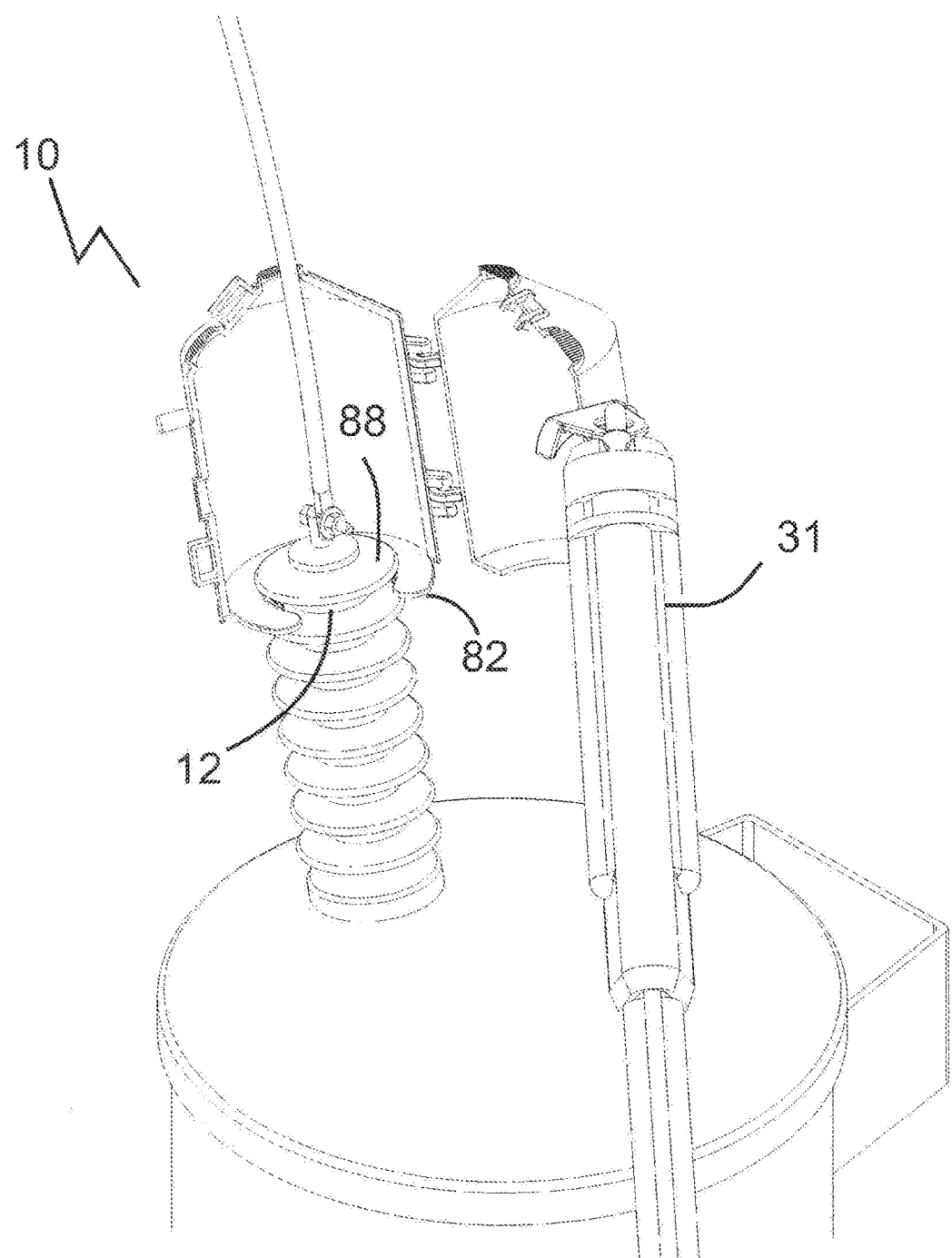
FIG. 8 is a perspective of the gripping portion of the cover of FIG. 7 secured to a bushing.
Figure 9:
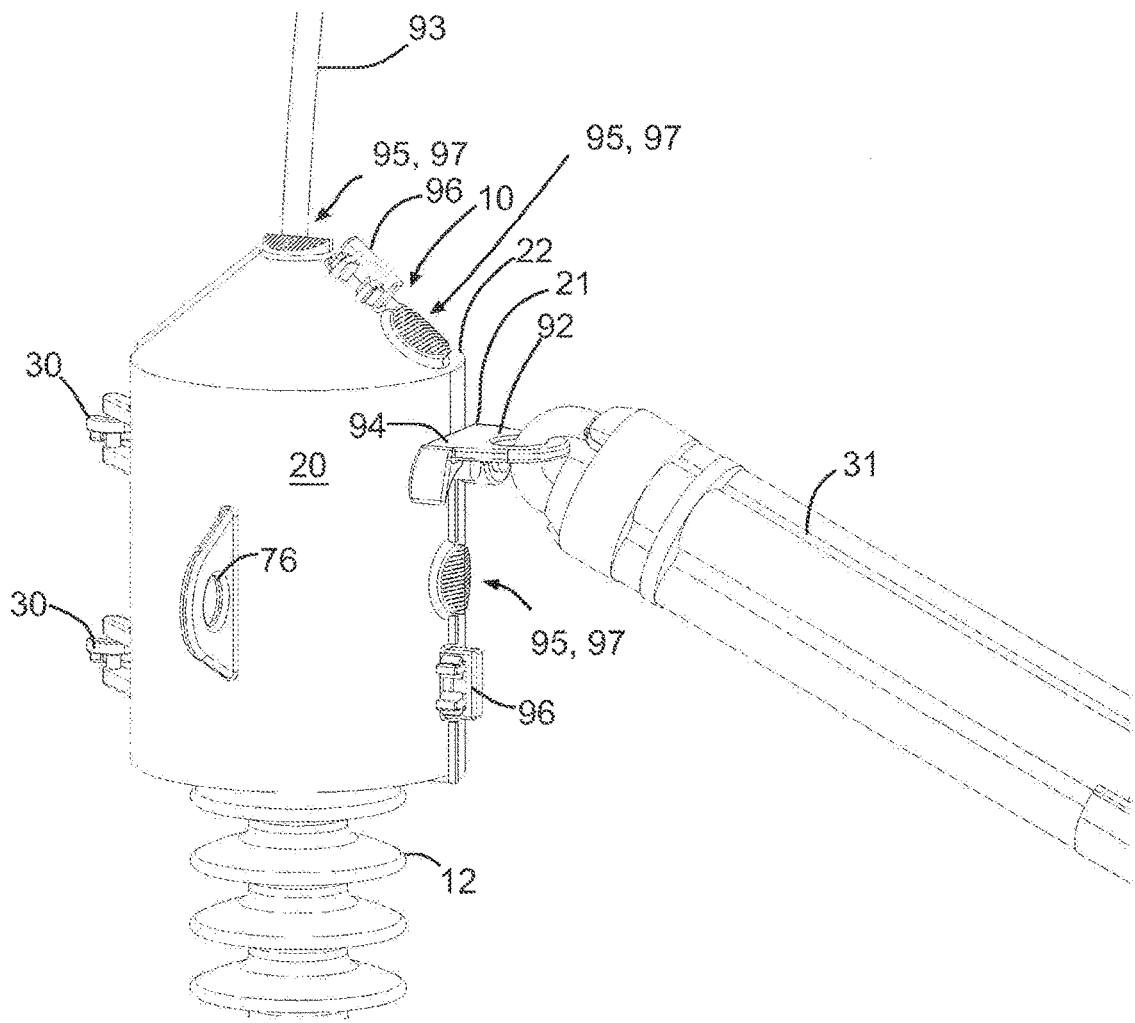
FIG. 9 is a perspective view of the enclosing portions of the clamshell bushing cover of FIG. 7 after being locked together.

Referring to FIGS. 7-10 a cover 10 shaped to fit an insulator bushing component 12 is illustrated. The bushing cover of FIGS. 7-10 has many parts similar to those found in cutout cover illustrated in FIGS. 1-5. Installation is carried out in a method similar to the cutout cover. A hot stick 31 remotely positions first portion 20 over bushing 12, which may include one or more wires (FIG. 7). Hot stick 31 is able to position first portion 20 through a hot stick connector such as lateral eyelet 76 in first portion 20 (FIG. 9).

Figure 10:
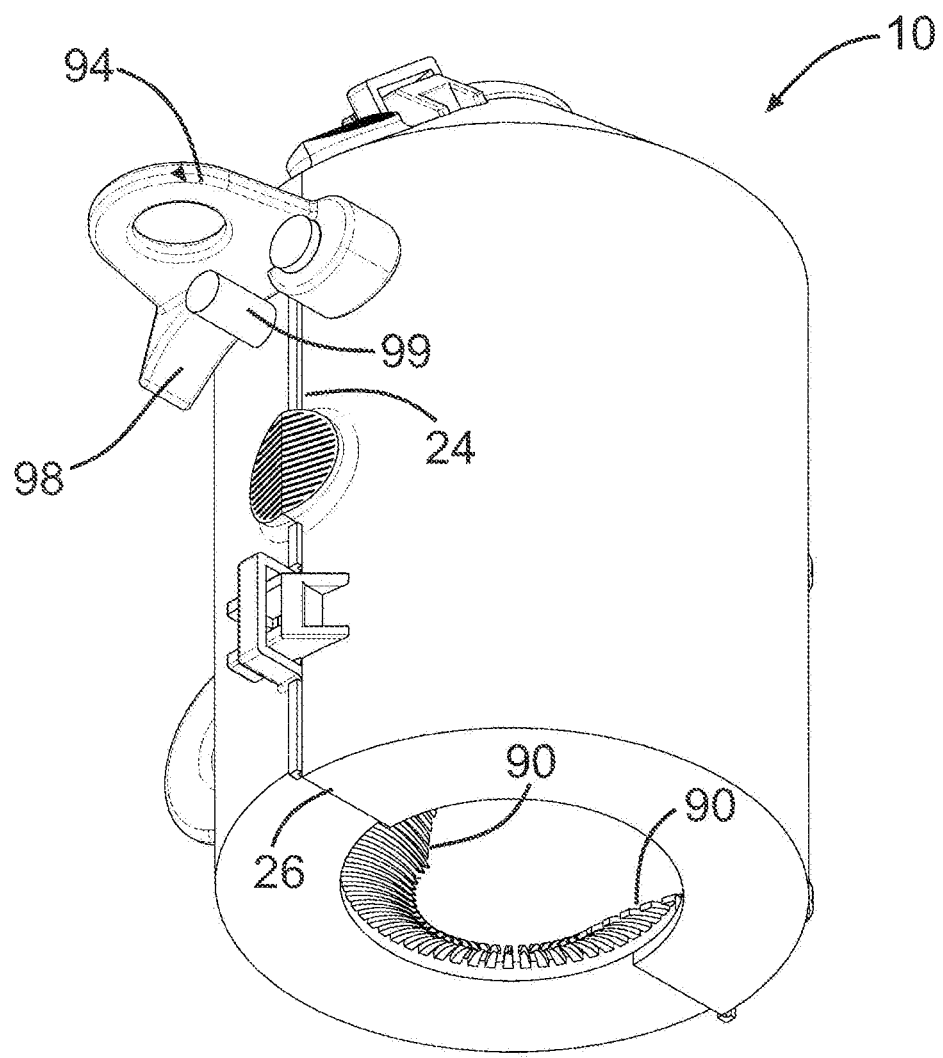
FIG. 10 is a rear perspective view of the base and sides of the bushing cover of FIG. 7.

The gripping part 18 of cover 10 is illustrated in FIG. 7 with a split ring spring latch 54, collectively formed by a plurality of resilient tines 80 tapered downwardly at a base 78 of the dielectric cover 10. Tines 80 are distributed around a split ring flange 82 forming base 78. Split rings include rings that span fewer radians than a full circle but more than half a ring. Example split rings include ⅔ or ¾ of a ring. In the example shown flange 82, which also forms part of gripping part 18, has an inner entry diameter 84 that is narrower than a bushing width 86, so first portion 20 may be laterally slid into position below an upper row or flight 88 of bushing insulator 12 (FIGS. 7-8). Once in position flange 82 prevents axial removal of first portion 20 from bushing 12 while tines 80 restrict against lateral removal and may provide sufficient friction against bushing 12 to allow second portion 22 to be closed over first portion 20 without first portion 20 rotating about bushing 12. In other cases first portion 20 may be axially slid over top rows or row 88. To facilitate the lateral entry used in the example, lateral notches 90 may be etched out from the radially outermost tines 80 to facilitate bending of tines 80 on contact with bushing 12 (FIGS. 7 and 10). Tines 80 may be used to accommodate various widths of bushing insulators and insulator shafts. Tines (not shown) may also be provided on base 79 of second portion 22.

Once first portion 20 is secured by tines 80, second portion 22 may be closed over secured first portion 20 (FIG. 9). A lock 21 may facilitate closing. As shown, hot stick 31 may be repositioned to grip hot stick connector, for example eyelet 92, located on lock latch 94 pivotally mounted on second portion 22. Latch 94 serves two purposes. One, eyelet 92 can be gripped by hot stick 31 to close portions 20, 22 (FIGS. 8-9). Two, clasp or latch 94 may be rotated into place to permit latch arm 98 to snap over lock rod 99 (FIGS. 9 and 10). On closing, one or more secondary latches such as snap closures 96 as shown may further lock cover 10 (FIG. 9). One or more edges 24 may overlap on closure, for example with a single overlap as shown or a double overlap as in the case of a tongue and groove fitting (not shown), to increase creepage distance and improve sealing from wildlife entry (FIGS. 9 and 10).

Figure 13:
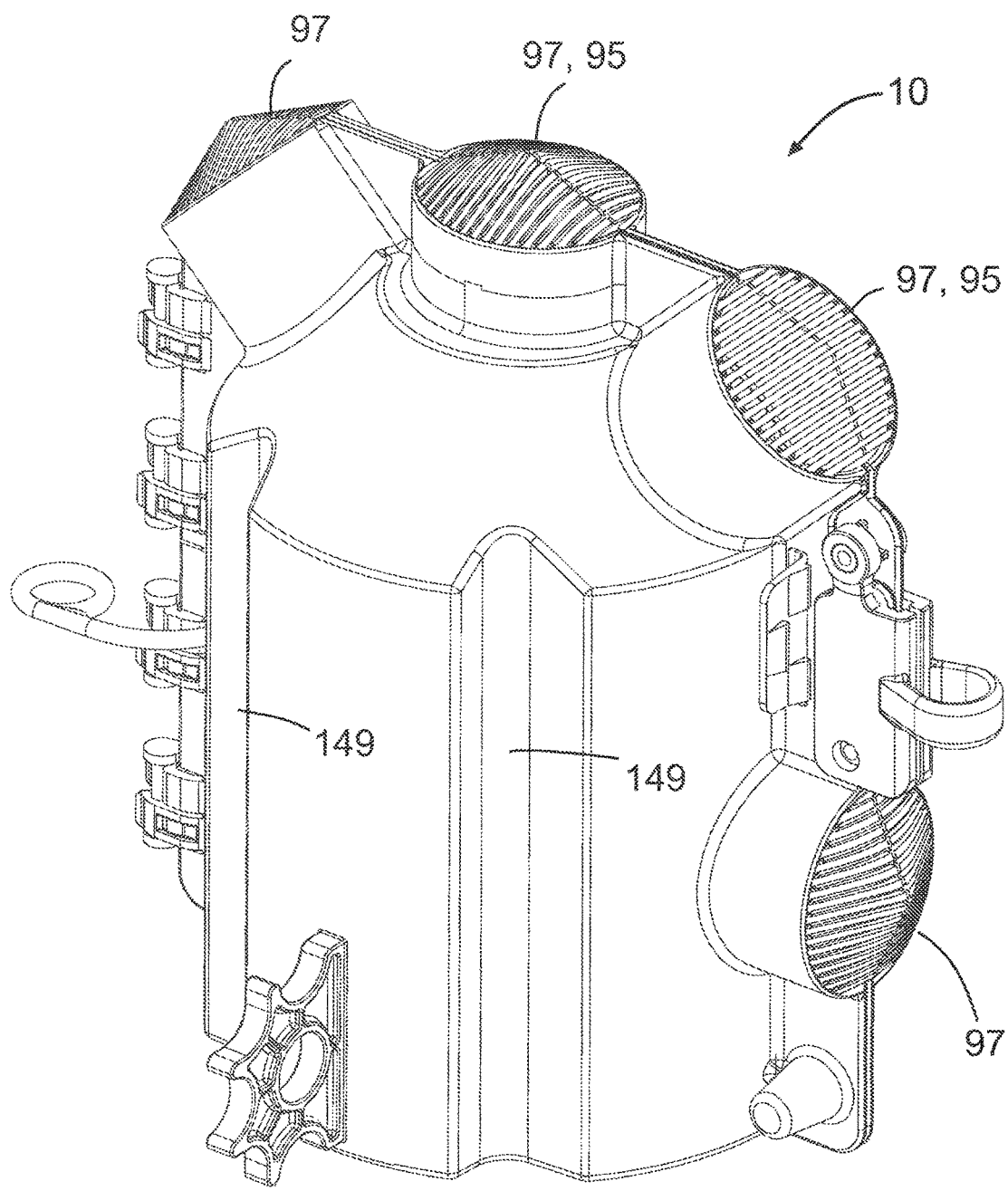
FIGS. 13-14 are front perspective views of the bushing cover of FIG. 11.
Figure 14:
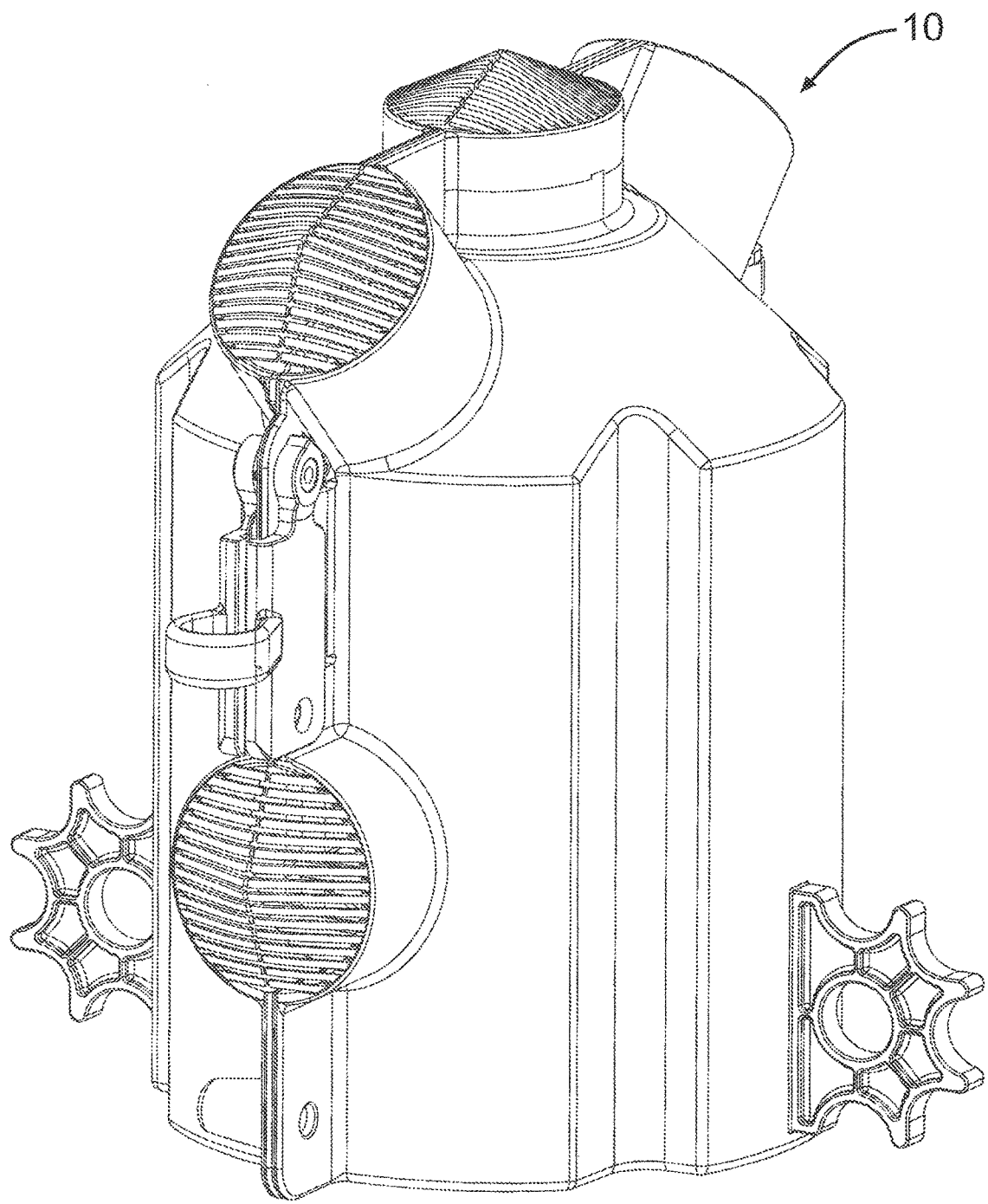
Figure 21:
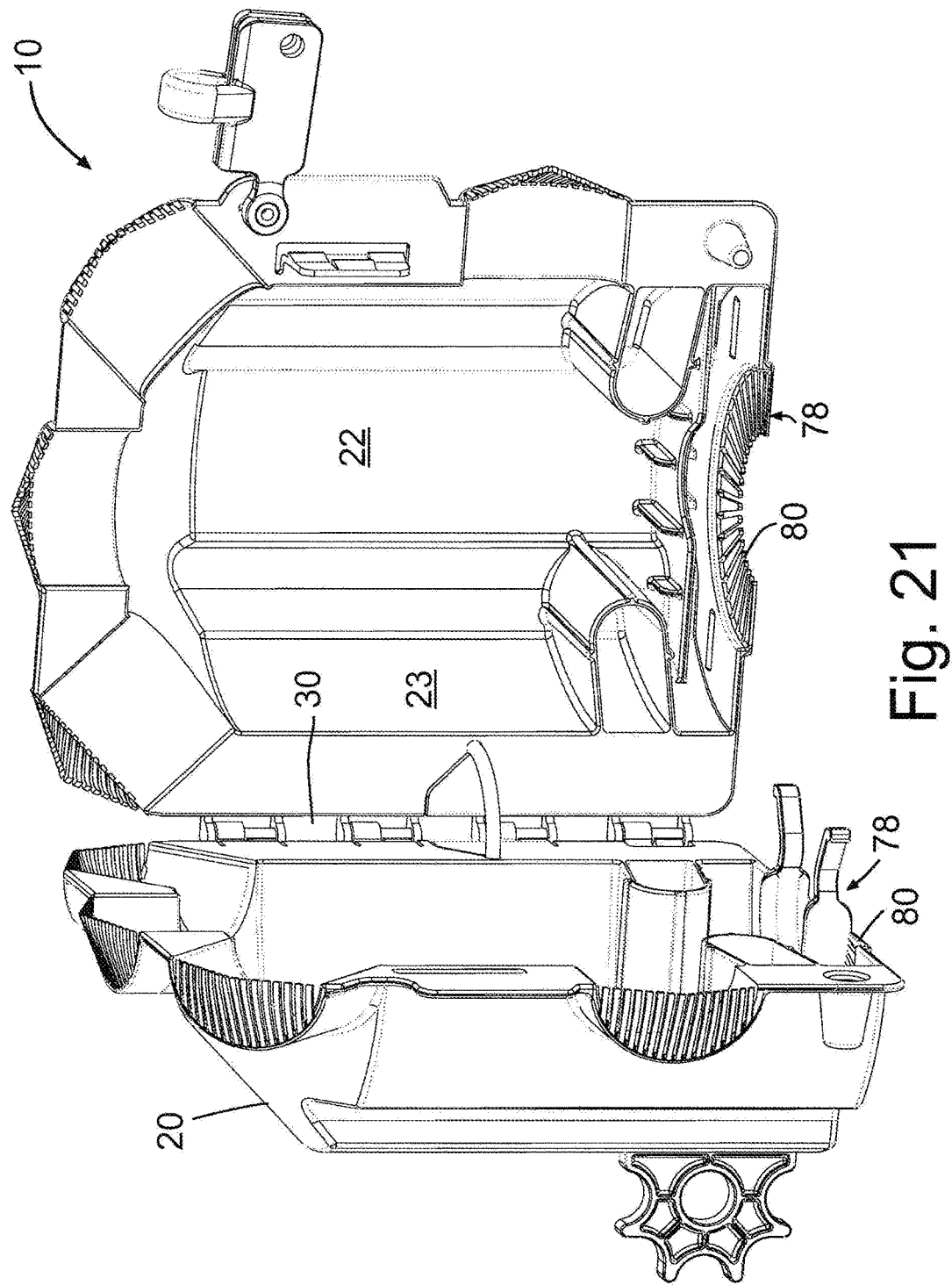
FIG. 21 is a front perspective view of the bushing cover of FIG. 20.

Referring to FIGS. 11-33 another embodiment of a bushing cover 10 is illustrated. Referring to FIG. 21, enclosing portions 20, 22 may be connected via a hinge 30 and define a component enclosing space 23 as shown. Similar to cover 10 shown in FIG. 7, the cover 10 in FIG. 21 has tines 80 at a base 78 of cover 10, except that tines 80 are positioned on both portions 20 and 22. The tines 80 of either portion 20 or 22 are half circles and thus do not form a gripping part 18 that is capable of gripping the bushing 12. Referring to FIG. 13, entry holes 97 with tines 95 are spaced around the perimeter of each portion 20, 22 to permit passage of one or more wires connected to a bushing (not shown) when the cover 10 is in position. Columnar indents 149 on cover 10 add reinforcing strength to cover 10.

Figure 15A:
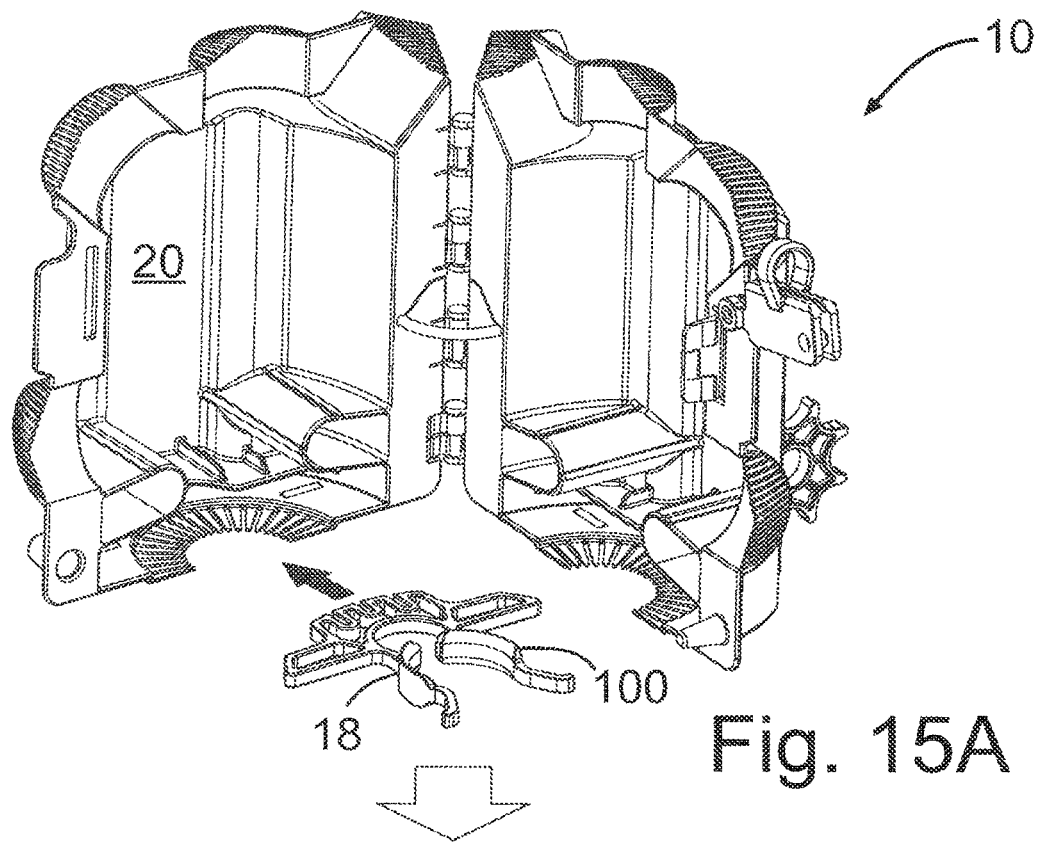
FIGS. 15A-15B are a sequence of perspective views of the bushing cover of FIG. 11 in the open position, illustrating a method of mounting a gripping insert to a first portion of the enclosing portions.
Figure 15B:
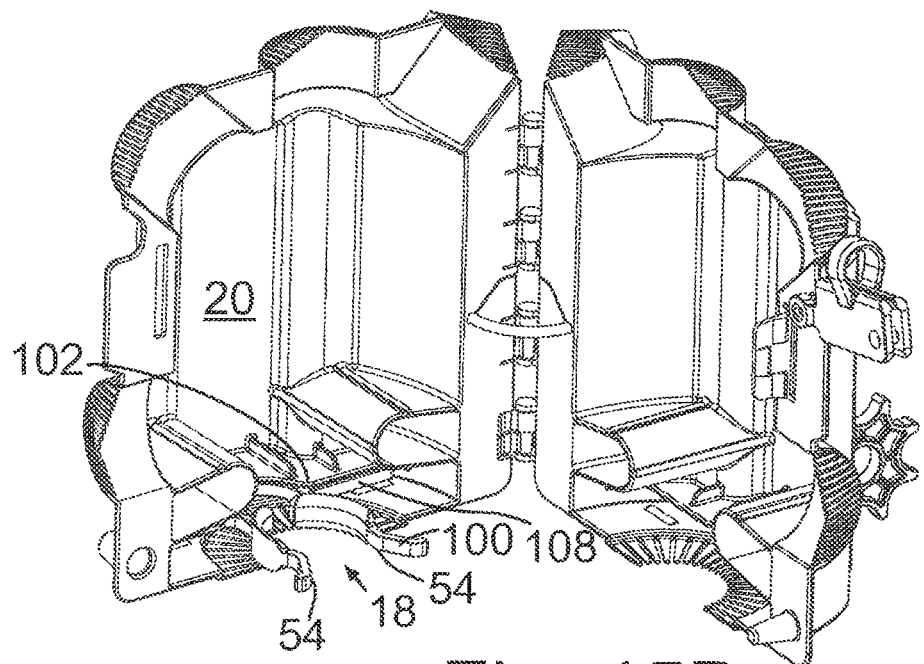
Figure 16A:
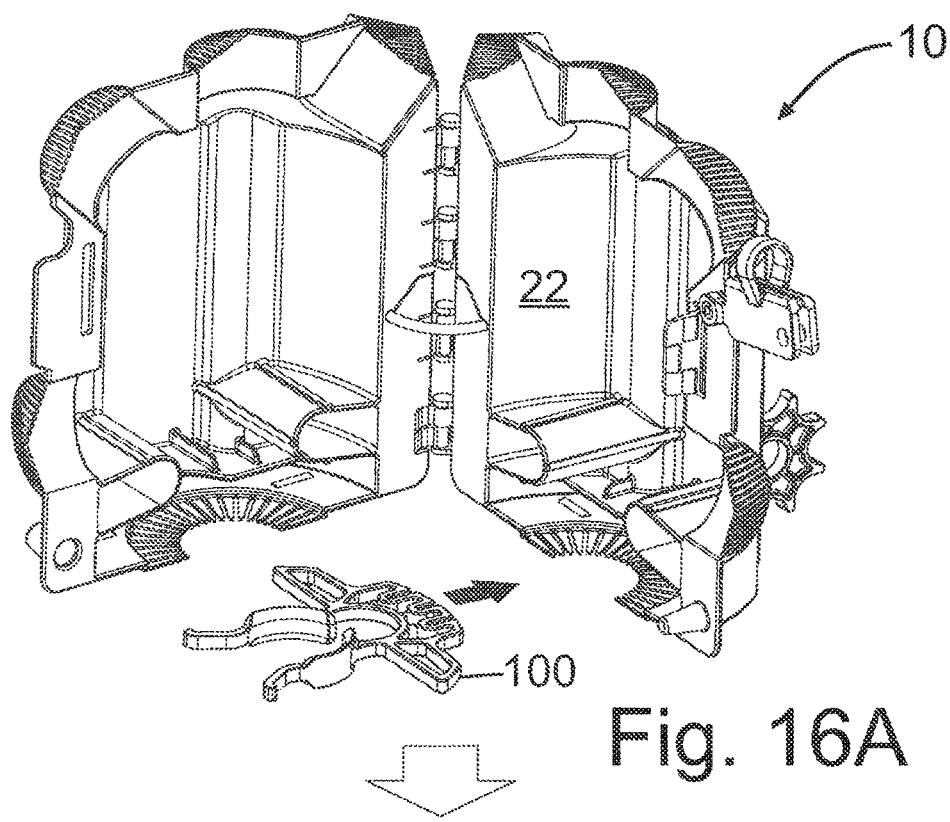
FIGS. 16A-16B are a sequence of perspective views of the bushing cover of FIG. 11 in the open position, illustrating a method of mounting a gripping insert to a second portion of the enclosing portions.
Figure 16B:
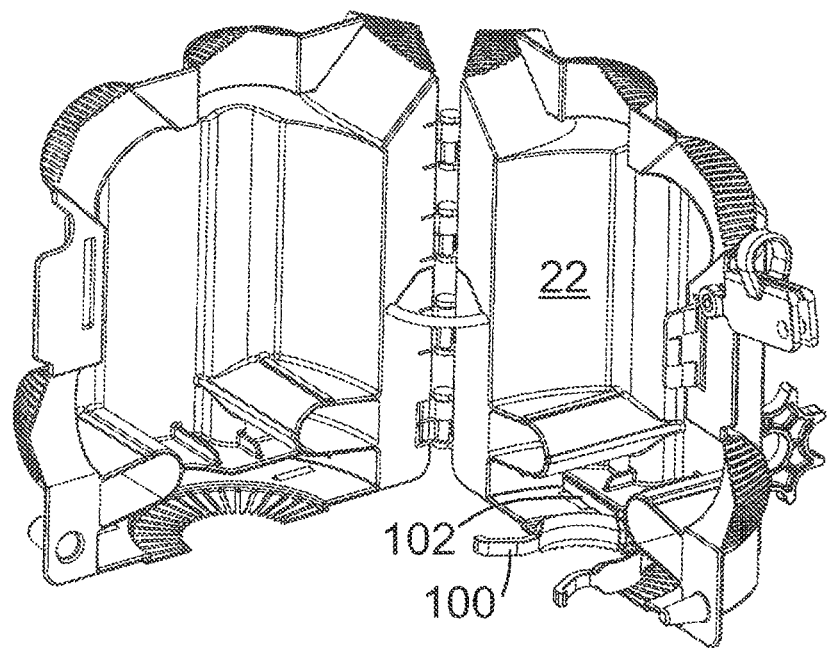
Figure 17:
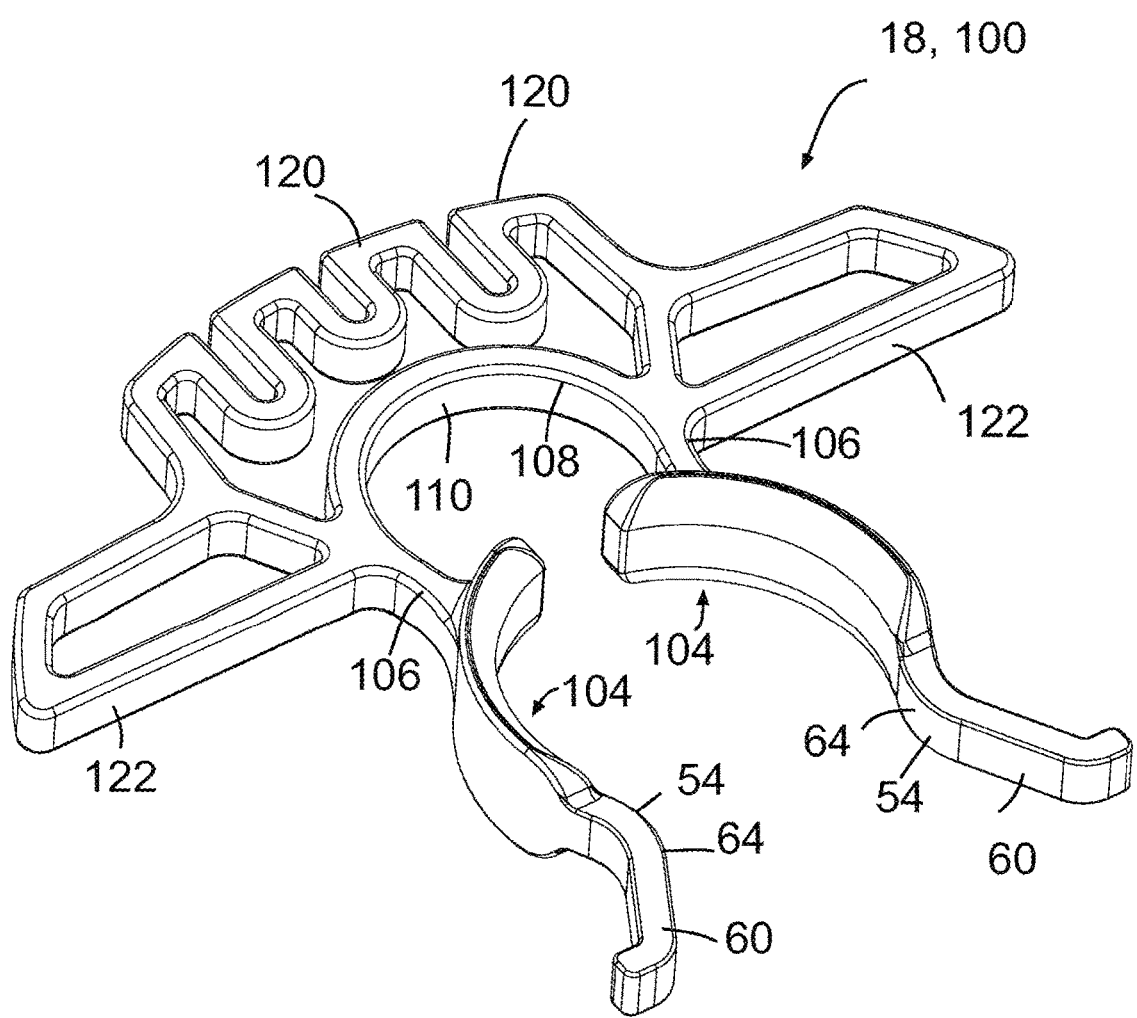
FIG. 17 is a perspective view of the gripping insert of FIGS. 15A-B and 16A-B.

Referring to FIGS. 11-33 the further features of cover 10 will be described by reference to the operation of the cover 10. Referring to FIGS. 15A-B and 17, in a first stage the cover 10 is assembled, for example by connecting portions 20 and 22, opening the cover 10, and mounting a gripping insert 100 to the portion 20. The gripping part 18 may thus comprise a gripper insert 100 removeably mounted in use to a gripper receiver 102 on one of the enclosing portions, in this case portion 20. Referring to FIGS. 16A-B, each enclosing portion 20 and 22 may comprise a gripper receiver 102 for independently receiving the gripper insert 100. Thus, either portion 20 or 22 may function as the first portion 20, giving the cover 10 more flexibility for installation from different sides of the bushing 12. Referring to FIG. 17 insert 100 may have a pair of spring latches 54. Latches 54 may define a partially or fully ring-shaped inner surface 104 for contacting the bushing 12 in use. Latches 54 may be extended from respective arms 106 from a backing 108, which may have a C-shaped inner surface 110. The attachment of latches 54 on arms 106 and with surface 110 permits greater lateral flexibility of latches 54 relative to one another when under lateral force, such as when latches 54 are opening to insert and grip a bushing 12. Latches 54 may include respective shoulders 64, which have respective peaks 65 in between the shoulders 64 and outwardly sloped guide surfaces 60. Thus, referring to the sequence in FIGS. 22-23, as guide surfaces 60 contact bushing 12, the surfaces 60 are biased outwards and the bushing 12 enters into contact with the ring-shaped inner surface 104.

Figure 18:
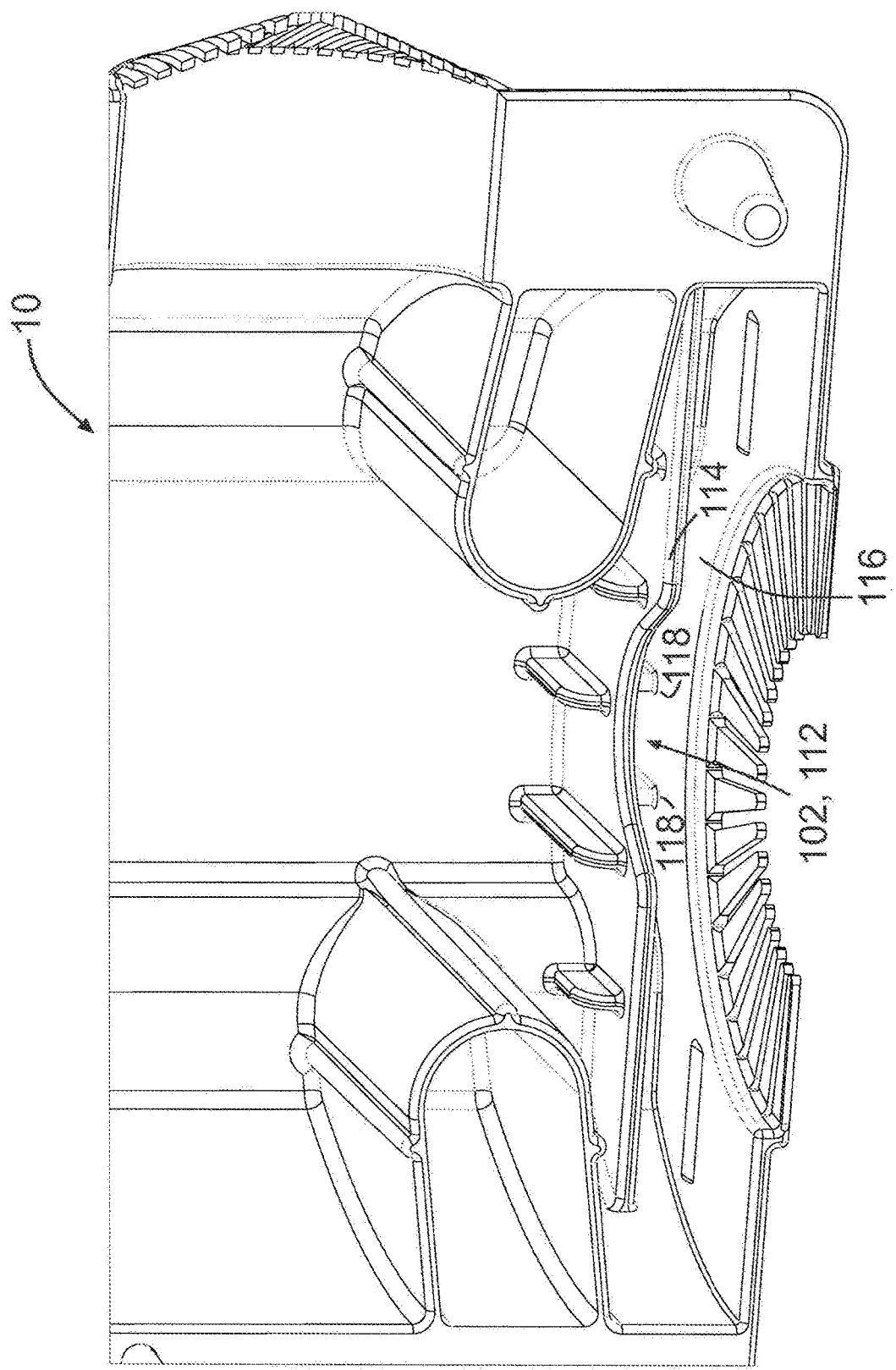
FIG. 18 is a perspective cut away view of a gripper receiver on the inside of one of the enclosing portions of the bushing cover of FIG. 11.
Figure 19:
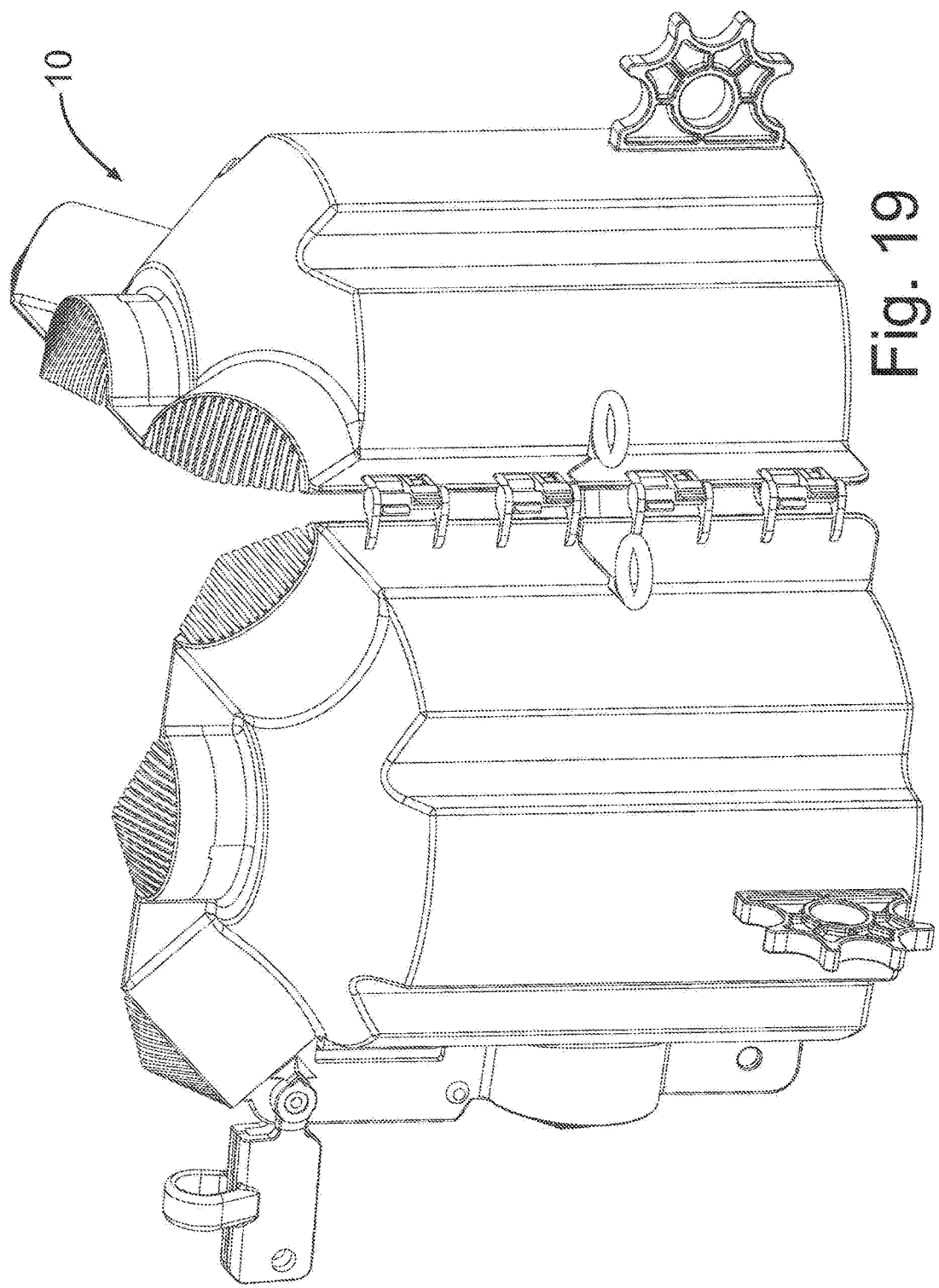
FIG. 19 is a rear perspective view of the bushing cover of FIG. 11 in an open position.
Figure 20:
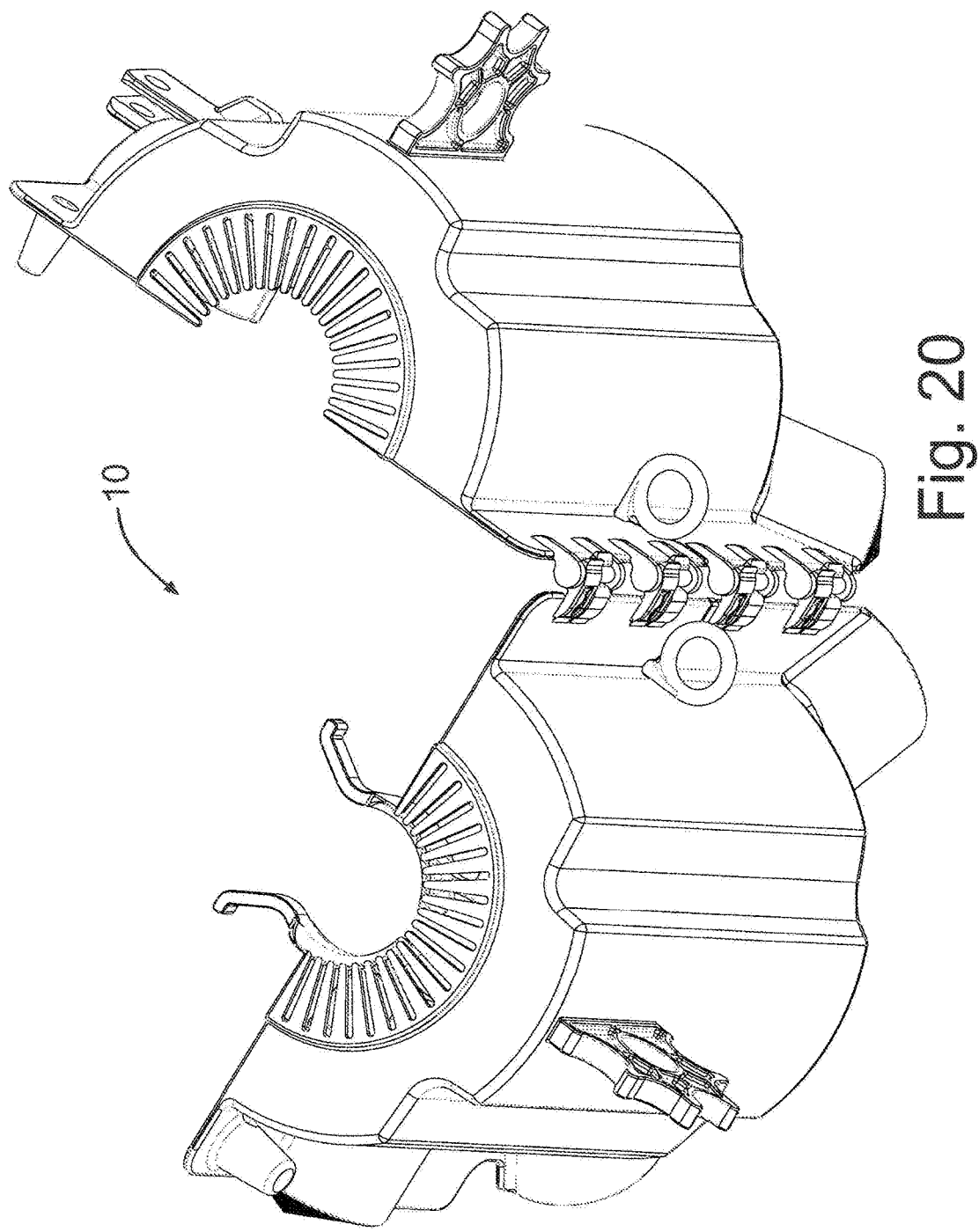
FIG. 20 is a bottom perspective view of the bushing cover of FIG. 19 with the gripping portion mounted.

Referring to FIGS. 15B, 17 and 18, a gripper receiver 102 may be provided as discussed. The receiver 102 may take a suitable shape, for example comprising a slot 112 comprised of upper and lower ledges 114, 116, respectively, for receiving an elongate backing 108 of insert 100 in between ledges 114 and 116. One or more combinations of rails and followers may be provided on insert 100 and receiver 102, for example rails 118 on receiver 102 and follower fingers 120 on insert 100 as shown. Rails 118 permit proper alignment and positioning of the insert 100 within receiver 102. One or more handles 122 may be provided on insert 100 for manual manipulation of insert 100 into and out of receiver 102. The provision of a removeable insert 100 as a gripping part permits use of a variety of sizes of gripping parts or inserts 100 to be used on a particular cover size 10. Thus, the cover 10 may be tailored to fit different equipment configurations in the field, which gives greater flexibility for installing the cover 10.

Figure 22:
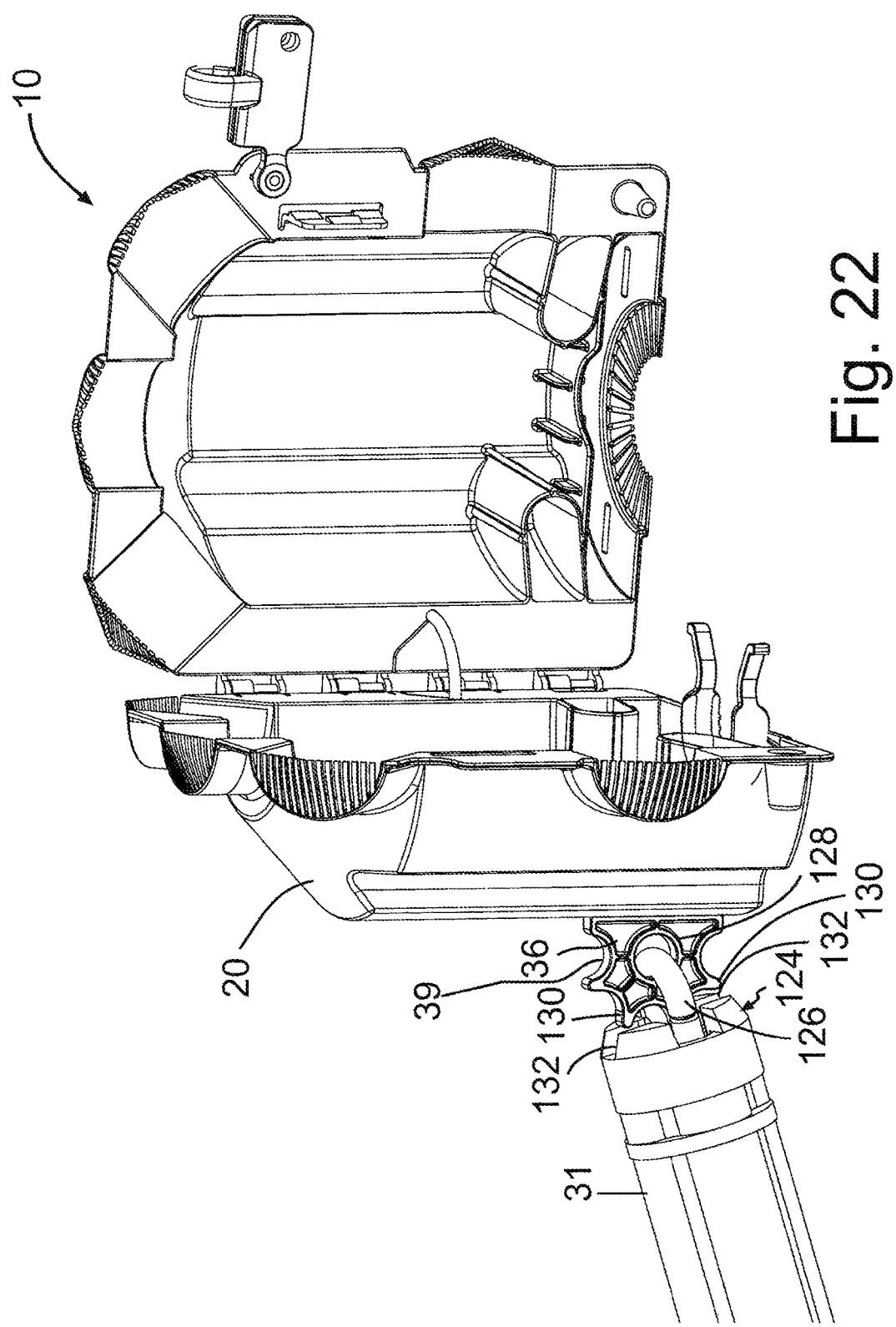
Figure 23:
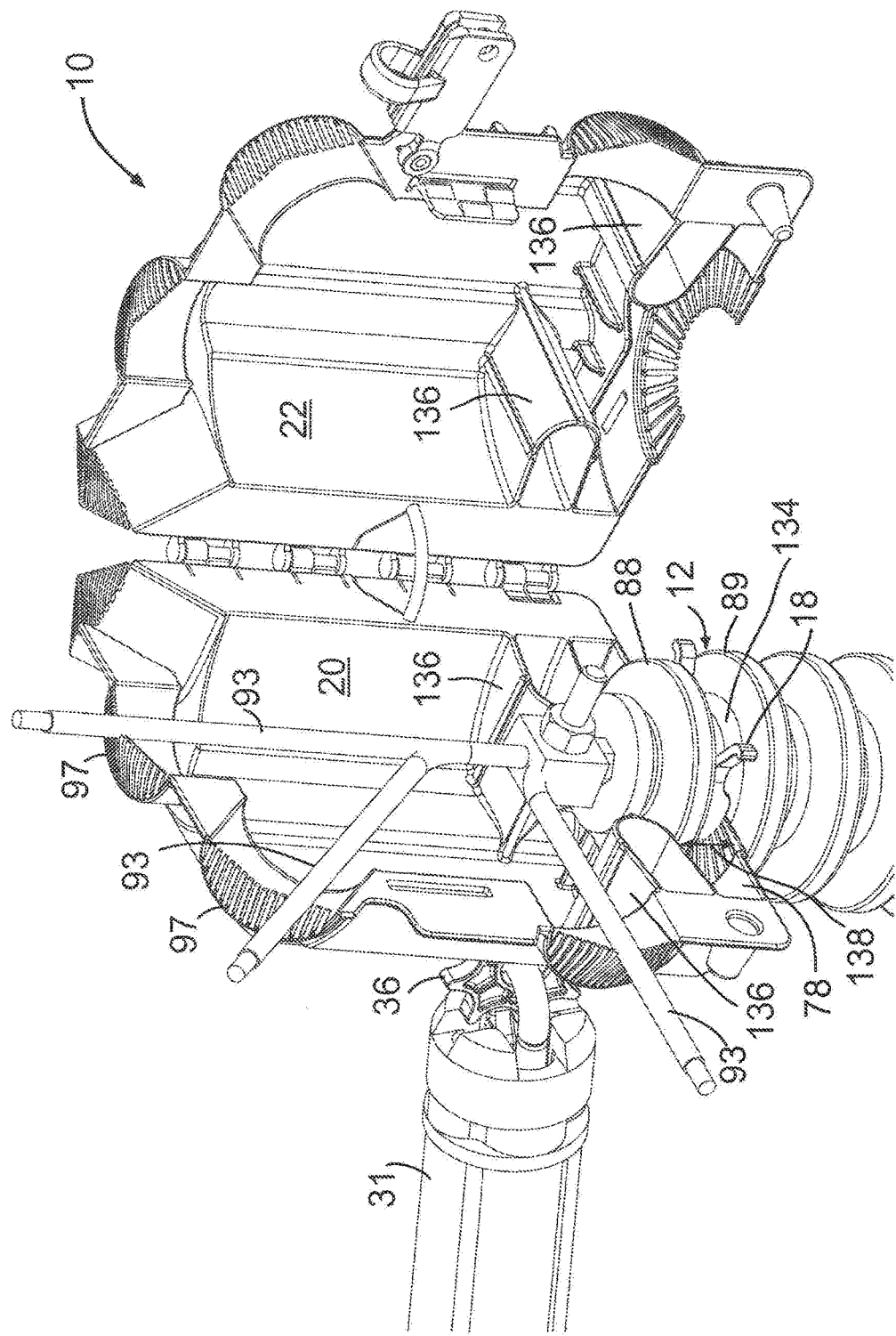

Referring to FIGS. 22 and 23, once assembled a hot stick 31, such as a clamp stick as shown, connects to hot stick connector 36 on portion 20. Hot stick connector 36 may have a series of indents 39 shaped to cooperate with clamp end 124 of hot stick 31 to permit positive control over cover 10. Thus, when hook 126 of clamp end 124 passes through eyelet 128 of connector 36, and hook 126 is retracted, spaced protrusions 130 of connector 36 fit within opposed slots 132 on clamp end 124 to prevent rotation of cover 10 about an axis (not shown) defined through eyelet 128. Positive control is beneficial because it means that cover 10 may be positioned by hot stick 31 without undesirable shifting, pivoting, or accidental release.

Referring to FIG. 23, the cover 10 is secured on bushing 12. Securing may be accomplished by inserting gripper part 18 in the throat 134 between the top row 88 and the second to top row 89 of bushing 12. The inner shape of portion 20 may facilitate alignment of cover 10 on upper row 88. For example, one or more inward protrusions 136 may define a row insertion gap 138 between a base 78 and protrusions 136 sized sufficient to fit a single or desired number of bushing rows 88. Portion 22 may have analogous protrusions 136 as shown. In other cases protrusions 136 may take other shapes, such as blades. When secured various wires 93 may extend through entry holes 97 as shown.

Figure 24:
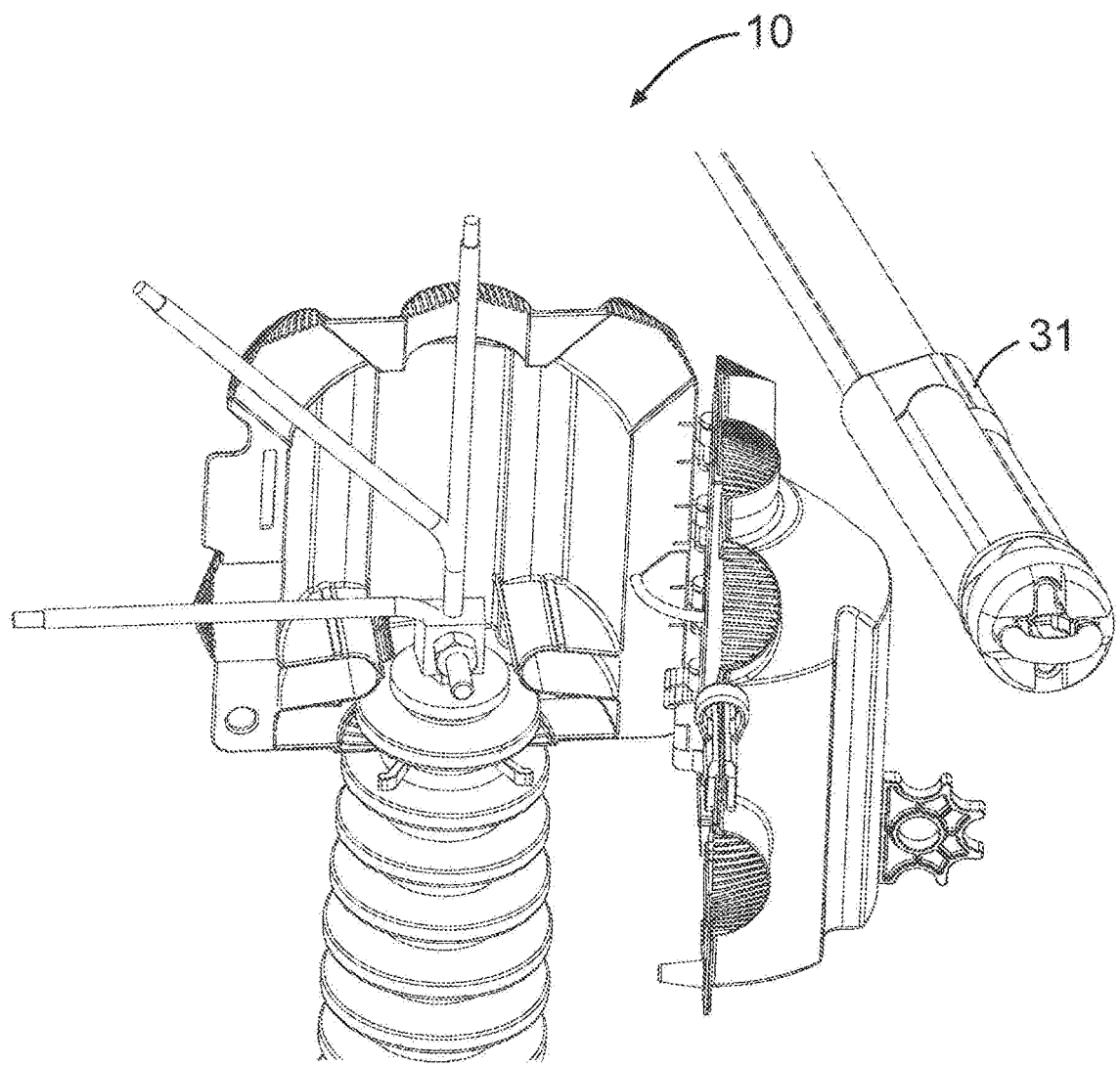
Figure 25:
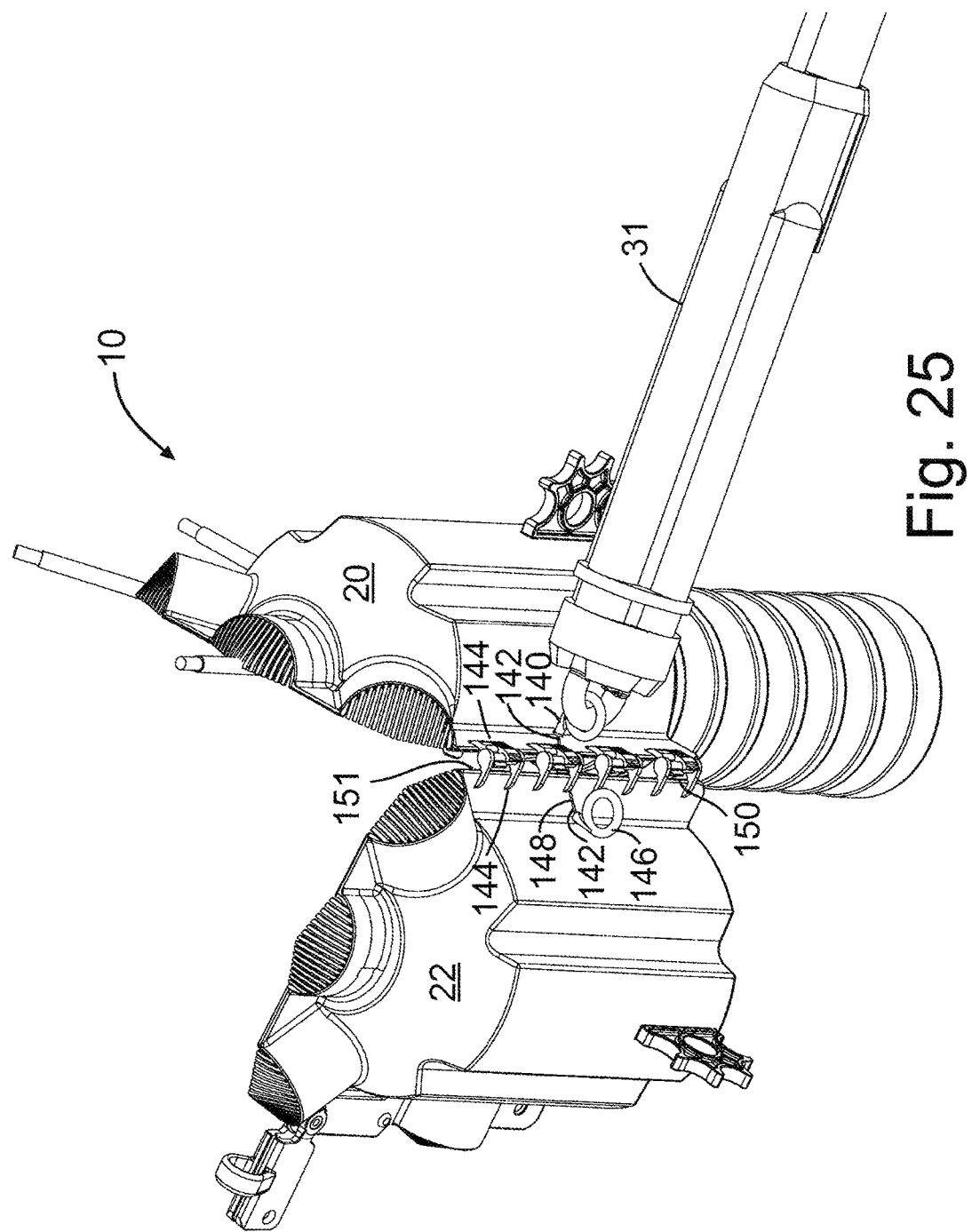
Figure 26:
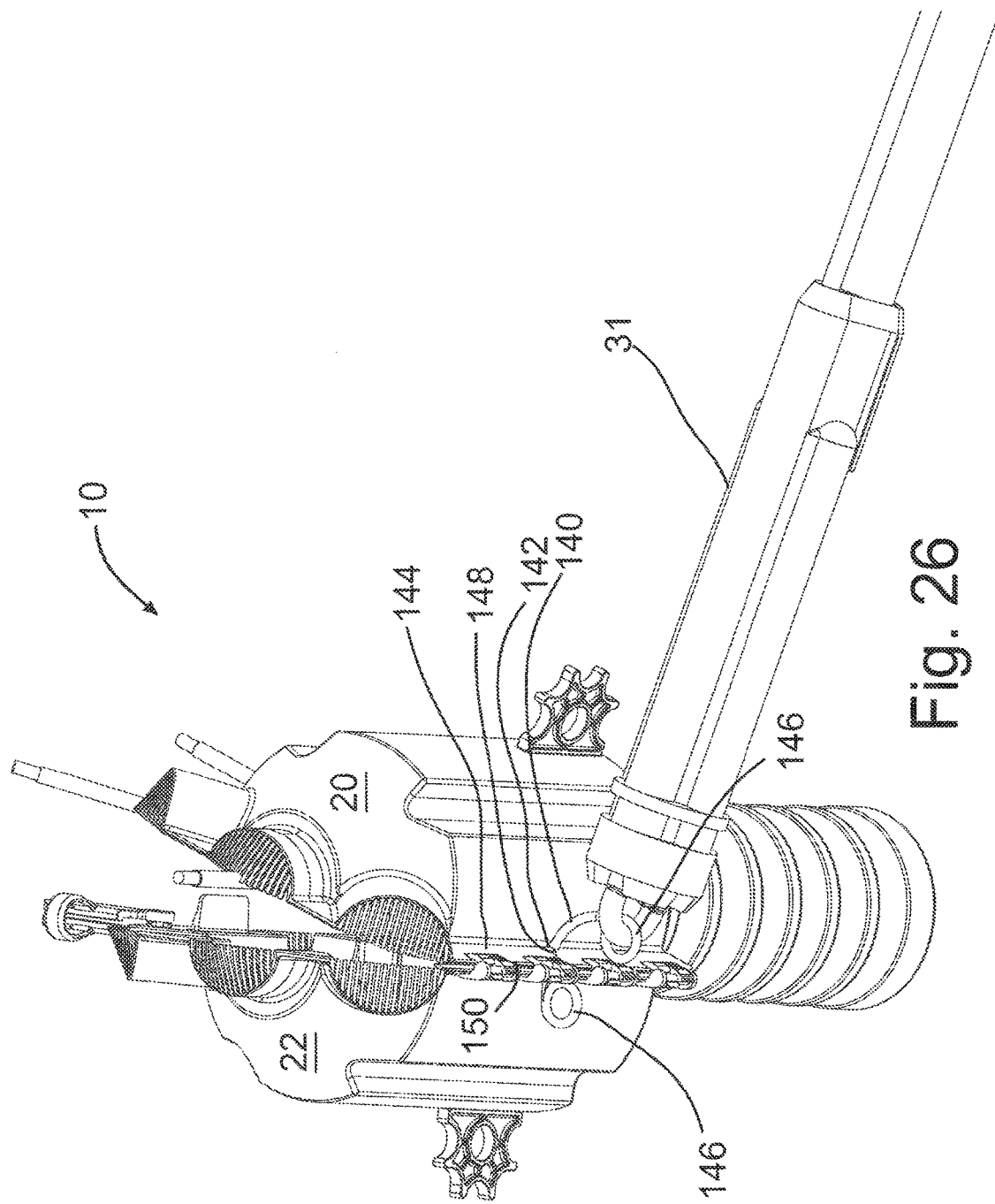

Referring to the sequence from FIGS. 24-26 the enclosing portions 20 and 22 may now be closed to enclose the component 12. Referring to FIGS. 25-26, a pull wire 140 is passed through apertures 142 in cooperating flanges 144 of the enclosing portions 20, 22. When in the closed position (FIG. 32), apertures 142 align so that pulling on one end (hot stick connector 146) of wire 140 using a hot stick 31 as shown will draw the flanges 144 and hence the portions 20, 22 together to enclose the bushing 12. Each hot stick connector 146 also forms a stop to prevent the wire 140 from being axially removed from the apertures 142. The apertures 142 may be positioned at the end of respective slots 148 from a hinge edge 151 of each respective flange 144, so that wire 140 may be installed by sliding through the slots 148 into position within apertures 142. Instead of a wire 140 an elongate member, leash, or other suitable member may be provided. In other cases a hot stick 31 may simply push portion 22 to close over portion 20.

Figure 27:
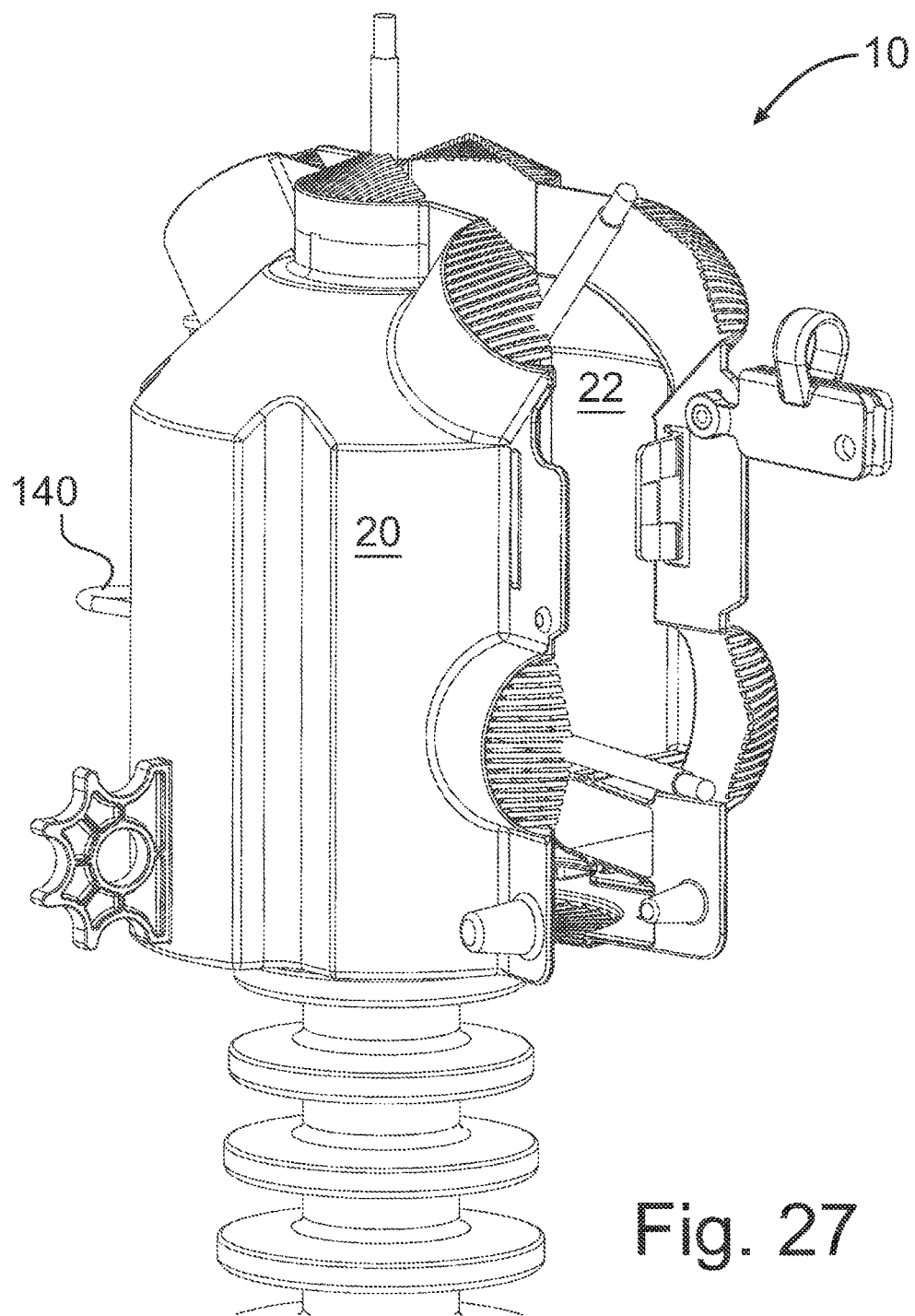
Figure 31:
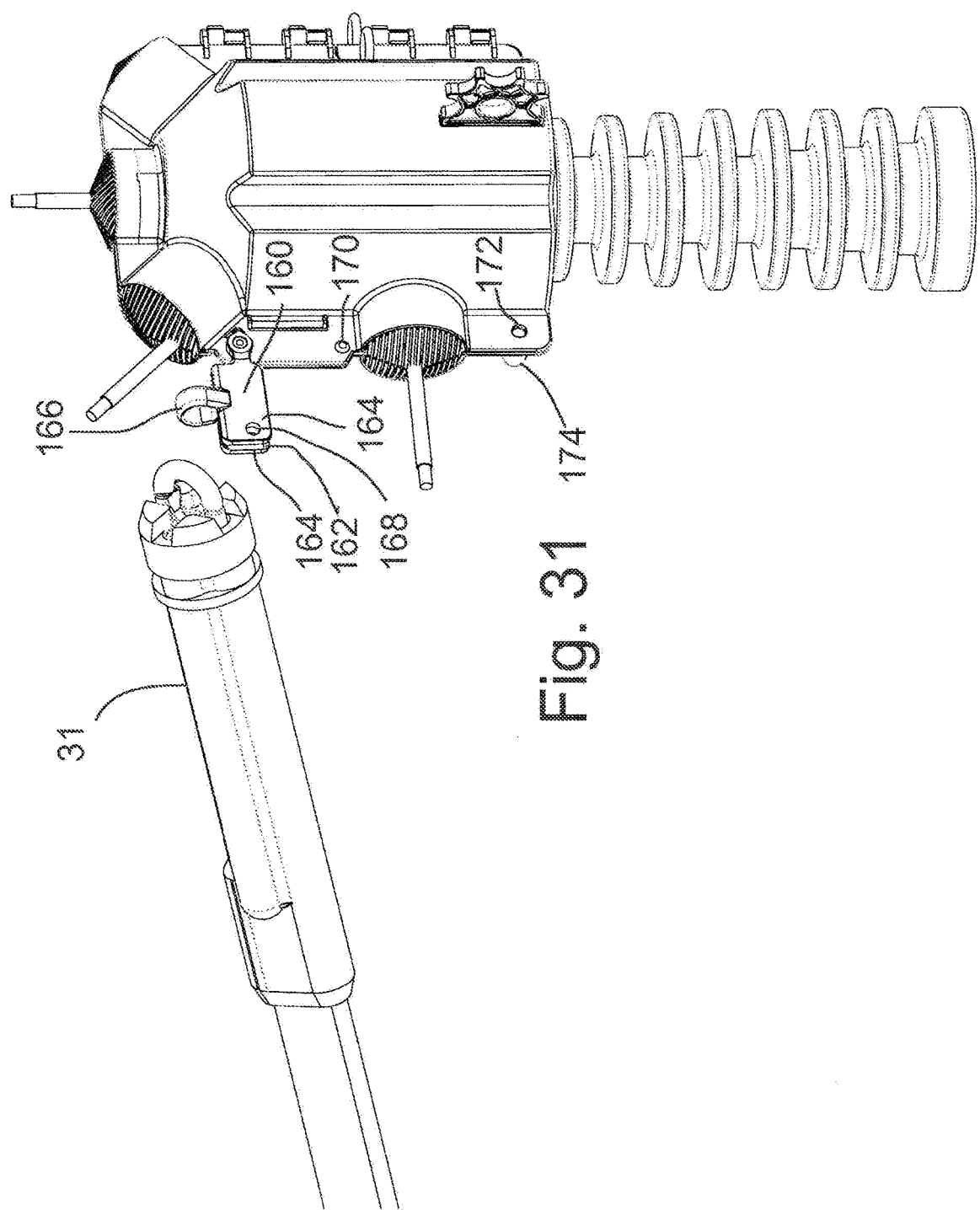
Figure 32:
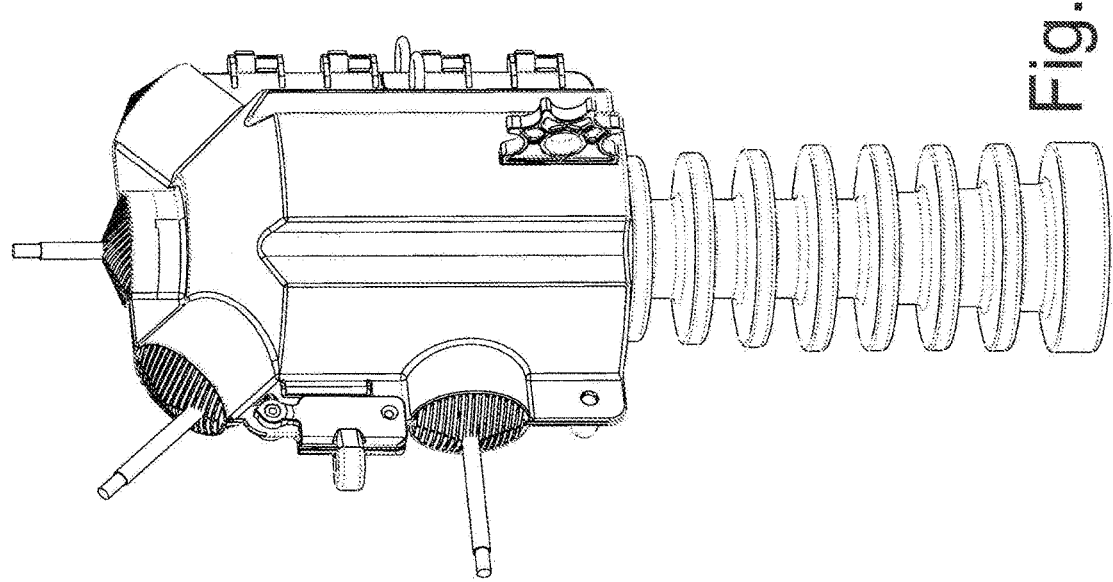
Figure 33:
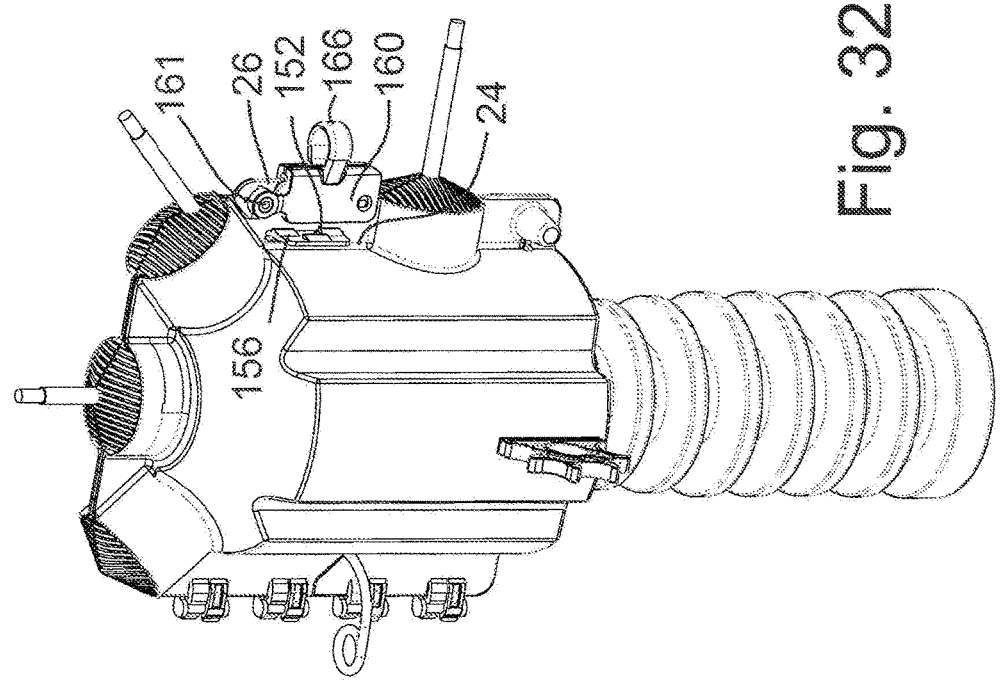

Referring to FIGS. 27-33, the closing and locking stages of the installation sequence are illustrated. Referring to FIGS. 27-28, the portions 20 and 22 are fully closed, for example using pull wire 140 or by some other suitable method of manipulating cover 10 via hot stick 31 (not shown). Referring to FIGS. 28 and 28A, as portions 20, 22 close a lateral latch tab 150 on portion 22 is inserted through a corresponding slot 152 in an outwardly extending flange 154 of portion 20. Tab 150 may have a ramp guide surface 156 shaped to wedge tab 150 radially inwards upon entering slot 152. Referring to FIG. 32, once guide surface 156 clears slot 152, a trough 158 (FIG. 29) aligns with slot 152 and ramp surface 156 springs outwards to retain slot edge 152 within trough 158. Thus, a first form of latching is achieved.

Referring to FIGS. 28A, 31, and 32, a second form of latching may be achieved. The lock may comprise a swing arm 160 with a slot 162 defined by opposed and spaced guide members 164 (FIG. 31). Swing arm 160 may be shaped to receive cooperating flanges 24, 26 of the opposed portions 20, 22 when in a locked and closed position (FIG. 32). The swing arm 160 shown has a pivot 161 with an axis (not shown) that passes through an interface plane defined by the cooperating flanges 24, 26 (FIG. 32). A hot stick connector 166 on arm 160 permits remote operation via a hot stick 31 (FIG. 31). A fastener (not shown) may be inserted through swing arm 160 and flange 154. When closed a protrusion 170 on flange 154 may extend into an aperture 168 on swing arm 160 (FIG. 31). Referring to FIG. 30 the swing arm 160 may have a protrusion 171 mating with an indent 173 in portion 22 to maintain the arm 160 in an open position until a sufficient manual force such as from a hot stick 31 dislodges the protrusion and permits the arm 160 to swing downwards.

The covers 10 shown in the Figures may incorporate one or more entry holes 97 surrounded at least in part by tines 95 (FIGS. 1 and 9 for example). Tines 95 accommodate components with various dimensions. For example, in FIG. 1 tines 95 accommodate one or more wires 93 passing through cover 10. Slots or holes 97 may be circular (FIG. 9), oblong (FIG. 1), or other shapes, for various purposes such as permitting entry of multiple adjacent wires (FIG. 3, oblong hole 97). In one case a single entry hole 97 may extend from base 78 to the top of the cover 10, and in some cases even to the hinge of the cover 10. The lock, such as swing arm 160 may be located at or near the base 78 to maximize the length of a single elongate entry hole 97.

Referring to FIG. 2, one or more steps of the method such as securing, closing, and locking may be carried out while the electrical power transmission system 14 is energized. Such a method may be advantageous, because it allows cover 10 to be placed and installed with ease by a user 33 outside a safe Limit of Approach, for example Limit of Approach 89B. In some embodiments cover 10 may be remotely placed into a position inside a safe Limit of Approach when the electrical transmission system 14 is energized. This may be done by a single user 33, operating hot stick 31, who is in a position outside of a safe limit of approach. Standard Limits of Approach, for example limits of approach 89A-B are generally set by the IEEE for live electrical systems. It should be understood that the Limits of Approach may vary according to region. The limits of approach, referenced here by 89A-B around energized equipment generally widen as the voltage increases. For this purpose, hot stick 31 may be provided in a length that is suitable for the various Limits of Approach standards in all jurisdictions. Other suitable techniques may be used, for example, anchoring, magnetic attachment, adhesive attachment, and attachment to a liveline tool, including suspending. In some embodiments, the component 12 comprises non-energized, for example grounded, electrical equipment that is located in close proximity to energized equipment of system 14 and thus lies within the Limit of Approach of the adjacent energized equipment. In some embodiments, the component 12 comprises energized or non-energized, for example grounded, electrical equipment that is located within system 14 in a spatial configuration that makes direct access difficult to accomplish.

Although most of the dielectric covers 10 illustrated in this document are shaped to fit bushings (not shown) for pole-mounted transformers or cutout switches, dielectric covers 10 may be made to fit other components of an electrical power transmission system. Other such components include pole-mounted transformers, dead ends (for example wire termination, overhead and underground), ampacts, lightning arrestors, and pin type insulators to name a few.

Figure 11:
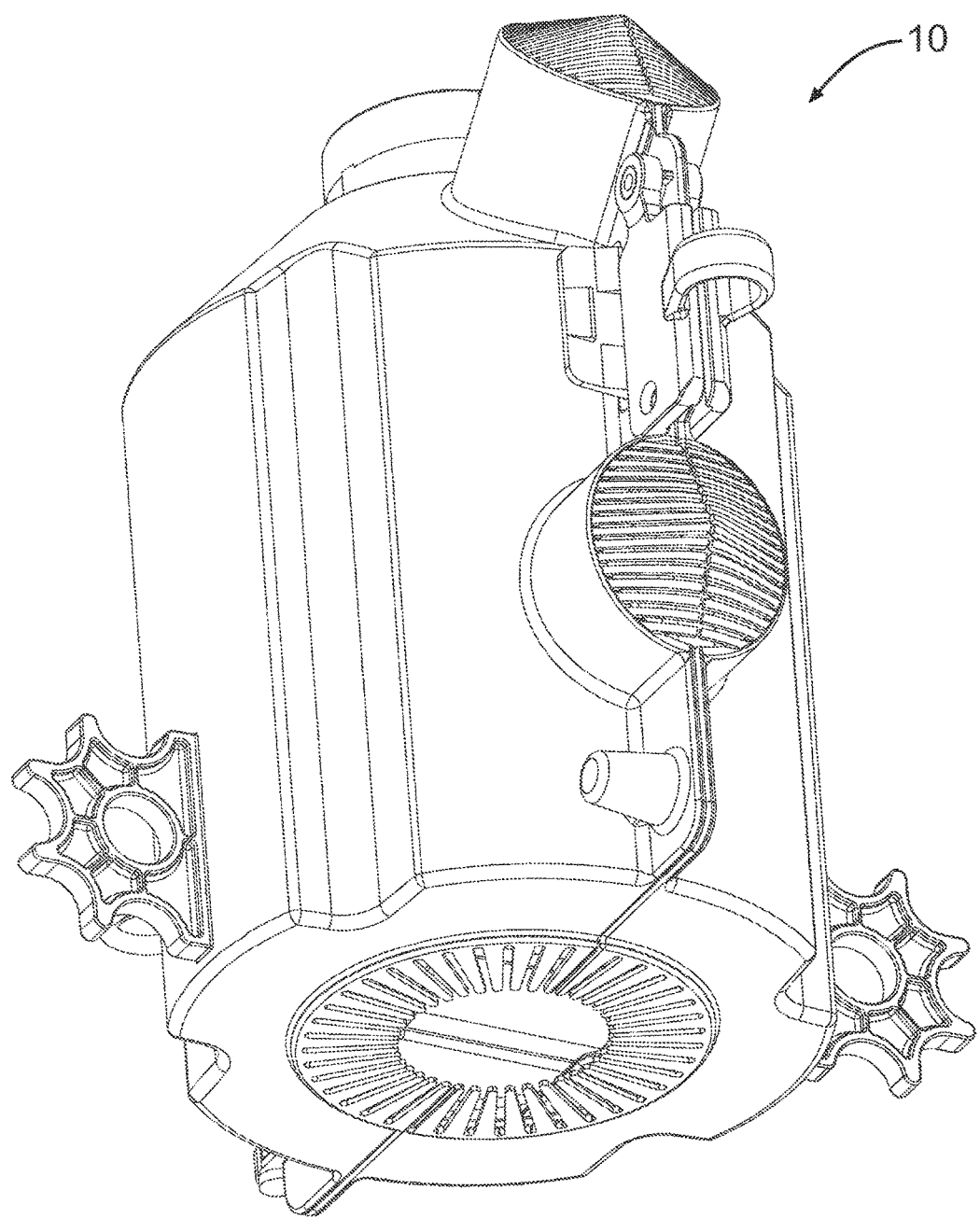
FIG. 11 is a front perspective view of another embodiment of a bushing cover in a closed and locked position.
Figure 12:
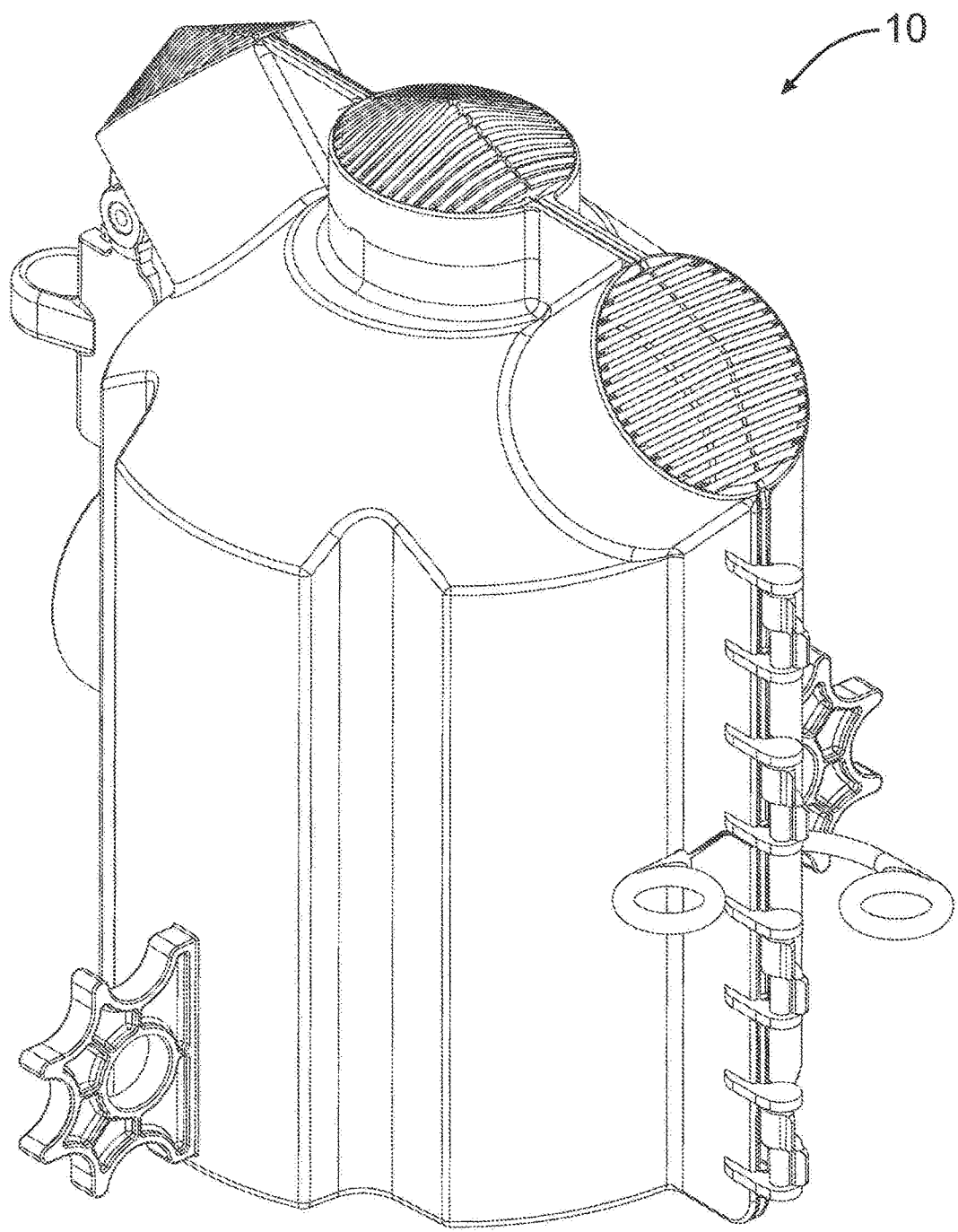
FIG. 12 is a rear perspective view of the bushing cover of FIG. 11.

Apertures or holes may be partial apertures, for example slots. Tines may be made of material resistant to animal or plant incursion. Cooperating mating combinations, such as protrusions 172 and indent 174 (FIG. 31) may be positioned along respective portions 20, 22 to facilitate alignment and closing. Apertures (not shown) may be provided in the side walls or cooperating flanges of portions 20, 22 for permitting manipulation via a hot stick 31. Covers 10 disclosed here may be installed manually by hand or using other tools. A spring biasing mechanism may be used to facilitate closing of the cover 10, for example by including a trigger within the component enclosing space 23 that may be tripped upon entry by the component 12. Cooperating tines from opposed portions 20, and 22 may lie in a plane or may be angled relative to one another, for example if tines 80 are extended outward as shown in FIG. 11. The base or other portions of tines 80 may have cutouts, indents, or necking to facilitate pivoting. Suitable hinges include living hinges, two part hinges, piano hinges, and other hinges such as a hinge formed by a male portion mated with a female portion. More than one portion 20, 22 may be present, for example three or more enclosing portions. Closing and locking may occur in a single movement.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A dielectric cutout cover for protecting a component that forms a fuse cutout of an electrical power transmission system, the dielectric cover comprising:
    an enclosing part having one or more enclosing portions that are configured to define a component enclosing space to enclose the component; and
    a gripping part comprising one or more latches for gripping at least part of the fuse cutout, in which the dielectric cover is shaped to fit the component;
    in which each of the one or more latches has:
        a sloped guide portion that biases the latch to open as it is lowered into place on a part of the fuse cutout; and
        a shoulder that forms a latch stop that locks the gripping part to the fuse cutout after the latch slides past the part of the fuse cutout.

2. The dielectric cutout cover of claim 1 in which each enclosing portion has a respective hot stick connector.

3. The dielectric cutout cover of claim 1 in which the one or more enclosing portions comprises two or more enclosing portions that are configured for relative movement to each other and form a clamshell cover.

4. The dielectric cutout cover of claim 1 in which the one or more latches further comprise one or more spring latches for gripping at least part of the component between the one or more spring latches.

5. The dielectric cutout cover of claim 4 in which the gripping part further comprises a pair of spring latches opposed to one another.

6. The dielectric cutout cover of claim 4 in which each of the one or more spring latches is terraced to provide plural latch stops for fitting components of different dimensions.

7. The dielectric cutout cover of claim 4 in which each of the one or more spring latches has a latch release handle.

8. The dielectric cutout cover of claim 1 in which the gripping part is C-shaped to in use fit over, and around side edges of, an upper contact plate of the fuse cutout, to enclose the upper contact plate between the shoulder and a base-facing flange of the dielectric cutout cover.

9. The dielectric cutout cover of claim 8 in which the gripping part has a flange guard for covering the upper contact plate.

10. The dielectric cutout cover of claim 1 in which the gripping part further comprises a split ring spring latch at a base of the dielectric cover.

11. The dielectric cutout cover of claim 1 in which the gripping part comprises a gripper insert removeably mounted in use to a gripper receiver on the enclosing part.

12. The dielectric cutout cover of claim 3 in which:
    the gripping part comprises a gripper insert removeably mounted in use to a gripper receiver on the enclosing part; and
    each enclosing portion comprises a gripper receiver for independently receiving the gripper insert.

13. The dielectric cutout cover of claim 1 further comprising a lock for securing the enclosing part in a closed position.

14. The dielectric cutout cover of claim 3 in which the two or more enclosing portions are connected via a hinge.

15. The dielectric cutout cover of claim 3 further comprising a pull wire passed through apertures aligned in cooperating flanges of the two or more enclosing portions when in the closed position, at least one end of the pull wire having a flange stop and at least the other end having a hot stick connector.

16. A method for protecting a component of an electrical power transmission system, the method comprising:
    securing a gripping part of a dielectric cover to the component, the gripping part connected to an enclosing part having one or more enclosing portions, in which the component forms a fuse cutout, with the gripping part comprising one or more latches for gripping at least part of the component; and
    closing the one or more enclosing portions over the fuse cutout.

17. A dielectric cutout cover for protecting a component that forms a fuse cutout of an electrical power transmission system, the dielectric cover comprising:
    an enclosing part defining a component enclosing space to enclose the component;
    a gripping part connected to the enclosing part and having a flange guard for covering an upper contact plate of the fuse cutout; and
    in which the gripping part further comprises one or more latches for gripping at least a part of the component with the one or more latches.

18. The dielectric cutout cover of claim 17 in which the enclosing part has a hot stick connector.

19. The dielectric cutout cover of claim 17 in which the enclosing part forms a clamshell cover.

20. The dielectric cutout cover of claim 17 in which the one or more latches further comprise one or more spring latches for gripping at least part of the component between the one or more spring latches.

21. The dielectric cutout cover of claim 20 in which the gripping part further comprises a pair of spring latches opposed to one another.

22. The dielectric cutout cover of claim 20 in which each of the one or more spring latches is terraced to provide plural latch stops for fitting components of different dimensions.

23. The dielectric cutout cover of claim 20 in which each of the one or more spring latches has a latch release handle.

24. The dielectric cutout cover of claim 17 in which the gripping part is C-shaped to fit over, and around side edges of, the upper contact plate.

* * * * *